(12) United States Patent
Muirhead et al.

(10) Patent No.: US 7,764,700 B2
(45) Date of Patent: Jul. 27, 2010

(54) SYSTEM FOR SUPPLY CHAIN MANAGEMENT OF VIRTUAL PRIVATE NETWORK SERVICES

(75) Inventors: Charles S. Muirhead, London (GB); David J. Page, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 546 days.

(21) Appl. No.: 11/790,842

(22) Filed: Apr. 27, 2007

(65) Prior Publication Data

US 2007/0286198 A1    Dec. 13, 2007

Related U.S. Application Data

(62) Division of application No. 10/322,322, filed on Dec. 17, 2002, now Pat. No. 7,684,321.

(60) Provisional application No. 60/342,270, filed on Dec. 21, 2001.

(51) Int. Cl.
*H04L 12/28* (2006.01)
*H04L 12/56* (2006.01)

(52) U.S. Cl. .................. 370/401; 370/395.21; 370/428; 370/466

(58) Field of Classification Search .......... None
See application file for complete search history.

(56) References Cited

U.S. PATENT DOCUMENTS

| | | | |
|---|---|---|---|
| 5,825,772 A | 10/1998 | Dobbins et al. | |
| 6,084,892 A | 7/2000 | Benash et al. | |
| 6,216,117 B1 | 4/2001 | Hall | |
| 6,473,404 B1 | 10/2002 | Kaplan et al. | |
| 6,577,327 B1 | 6/2003 | Rochford et al. | |
| 6,614,781 B1 | 9/2003 | Elliott et al. | |
| 6,650,632 B1 | 11/2003 | Volftsun et al. | |
| 6,662,221 B1 | 12/2003 | Godna et al. | |
| 6,941,380 B2* | 9/2005 | Cunningham | 709/235 |
| 6,944,183 B1 | 9/2005 | Iyer et al. | |
| 7,133,417 B1 | 11/2006 | Kao et al. | |
| 7,154,901 B2 | 12/2006 | Chava et al. | |
| 7,237,138 B2 | 6/2007 | Greenwald et al. | |
| 7,263,597 B2* | 8/2007 | Everdell et al. | 712/11 |
| 7,426,210 B1* | 9/2008 | Miles et al. | 370/400 |
| 7,483,411 B2* | 1/2009 | Weinstein et al. | 370/338 |
| 2002/0039352 A1 | 4/2002 | E-Fekih et al. | |
| 2002/0087713 A1* | 7/2002 | Cunningham | 709/235 |

(Continued)

FOREIGN PATENT DOCUMENTS

EP    0666670    12/1994

(Continued)

OTHER PUBLICATIONS

PCT International Search Report, issued on Jun. 10, 2005 in PCT International Application No. PCT/GB2004/005102. (Total 3 pages).

(Continued)

*Primary Examiner*—Chi H Pham
*Assistant Examiner*—Soon-Dong D Hyun

(57) ABSTRACT

The system for the supply chain management of network services, preferably virtual private network services, provides hardware, processes and application tools useful in configuring and/or delivering substantially measurable virtual private network services.

41 Claims, 19 Drawing Sheets

U.S. PATENT DOCUMENTS

| | | | |
|---|---|---|---|
| 2002/0136376 | A1 | 9/2002 | Fleischer et al. |
| 2003/0055990 | A1 | 3/2003 | Cheline et al. |
| 2003/0123446 | A1 | 7/2003 | Muirhead et al. |
| 2004/0196858 | A1 | 10/2004 | Tsai et al. |

FOREIGN PATENT DOCUMENTS

| | | |
|---|---|---|
| EP | 1111840 | 6/2001 |
| WO | WO9836369 | 8/1998 |
| WO | WO0011885 | 3/2000 |
| WO | WO0022792 | 4/2000 |
| WO | WO0072183 | 11/2000 |
| WO | WO0114983 | 3/2001 |
| WO | WO0117169 | 3/2001 |
| WO | WO0131857 | 5/2001 |
| WO | WO0160000 | 8/2001 |
| WO | WO03055153 | 7/2003 |

OTHER PUBLICATIONS

PCT International Preliminary Report on Patentability (1 page); Written Opinion of The International Searching Authority (7 pages); all mailed on Jun. 13, 2007 in PCT International Application No. PCT/GB2004/005102. (Total 8 pages).

EP Communication Pursuant to Article 96(2) EPC (1 page); Examination Report Reasons/EPO Form 2906 01.91CSX (8 pages); all mailed on Aug. 16, 2007 in EPO Application No. 04 805 930.7.(Total 9 Pages).

European Search Report for EP Application No. EP 02 79 0678, mailed on Sep. 27, 2005 (Total 4 pages).

PCT Invitation to Restrict or to Pay Additional Fees mailed on May 24, 2004 in PCT International Application No. PCT/IB02/05776. (4 pages).

PCT Written Opinion mailed on Mar. 17, 2004 in PCT International Application No. PCT/IB02/05776 (Total 2 pages).

International Search Report issued in PCT International Application No. PCT/IB02/05776 dated Oct. 28, 2003 (5 pages).

Notification of Reason for Rejection, issued by the Japan Patent Office (Translation); issued on Feb. 5, 2008 in Japan Patent Application No. 2003/555,750 (4 pages).

Lewis, Lundy, Spectrum Service Level Management Definition, Offerings, and Strategy, Mar. 30, 1998, XP-002150696, Technical Note lml-ctron-98-02, Mar. 30, 1998 (18 pages).

Graham Chen, Kong Qinzheng Kong, Integrated Management Solution Architecture, NOMS 2000, IEEE/IFIP Network Operations An Management Symposium "The Networked Planet: Management Beyond 2000", IEEE 2000 (pp. 217-230) (Total 32 pages).

Langer, Michael; Nerb; Michael, An ODP Enterprise Specification of Customer Service Management for Connectivity Services, Proceedings Third International Enterprise Distributed Object Computing Conference, 1999. EDOC 99, University of Mannerheim, Germany Sep. 27-30, 1999 (pp. 94-102) (14 pages).

Ford, Juanita C; Girardi, Philip G Ph.D.; Proactive Network Design, Aerospace Conference, 1999 IEEE Aerospace Conference Proceedings, vol. 5 of 5, Mar. 6, 1999 (pp. 113-130) (24 pages).

Final Decision for Rejection issued by the Japan Patent Office Translation issued on Jul. 1, 2008 in Japan Patent Application No. 2003555,750.

PCT Notification Concerning Documents Transmitted (1 page); International Preliminary Examination Report (1 page); International Preliminary Examination Report—Separate Sheet (6 pages); Notification Concerning Transmittal of The International Preliminary Examination Report (1 page); International Preliminary Examination Report—Separate Sheet (3 pages); International Preliminary Examination Report (4 pages); Written Opinion; all mailed in PCT International Application No. PCT/IB02/05776 on Jul. 7, 2009 (18 pages).

* cited by examiner

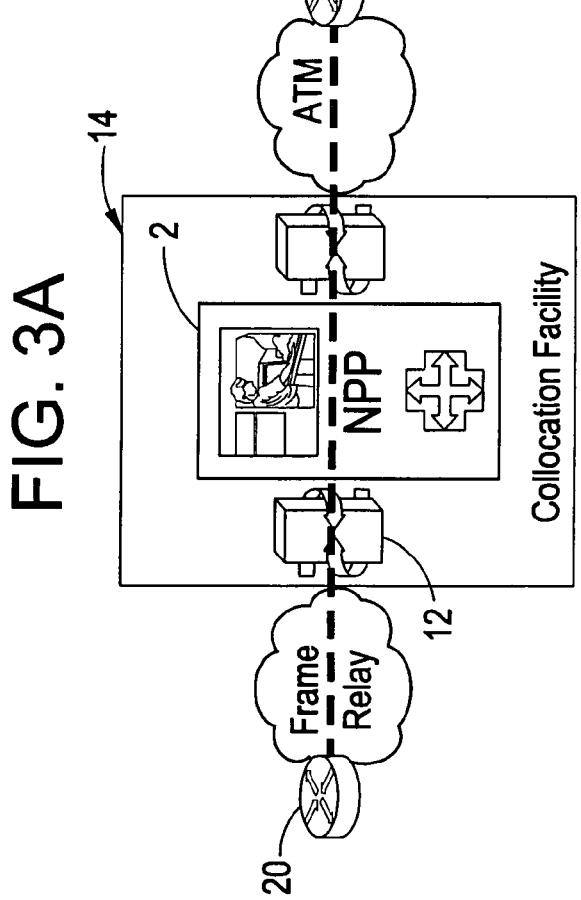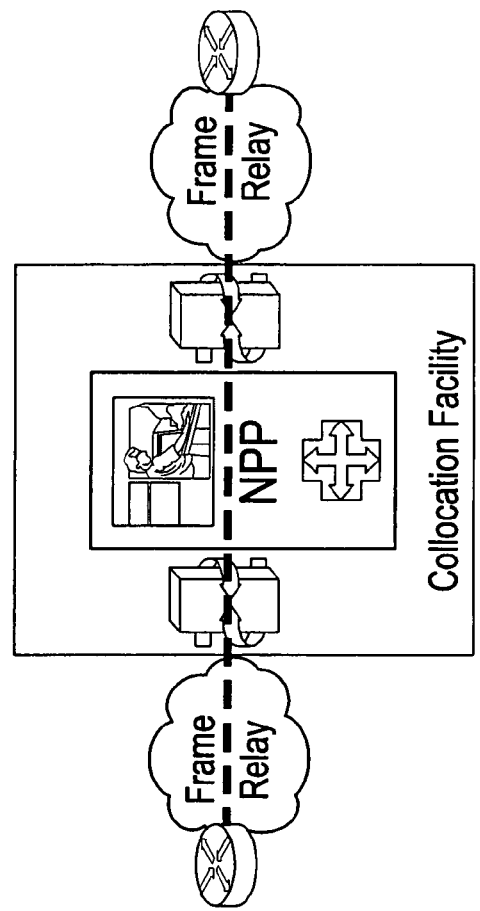

SYSTEM FOR SUPPLY CHAIN MANAGEMENT OF VIRTUAL PRIVATE NETWORK SERVICES

RELATED APPLICATION

This application is a divisional of U.S. patent application Ser. No. 10/322,322 filed Dec. 17, 2002 now U.S. Pat. No. 7,684,321, which claims priority to U.S. Provisional Application Ser. No. 60/342,270 filed on Dec. 21, 2001, incorporated herein by reference.

FIELD OF INVENTION

The present invention generally relates to the field of virtual private networks. More particularly, the present invention relates to the architecture, processes and systems involved in configuring and/or delivering managed virtual private networks (VPNs) and VPN services.

BACKGROUND OF INVENTION

As more and more people rely on the ability to communicate data electronically, there is a growing dependency by firms and organizations on the computer networks used to connect its users to each other. For many businesses that have geographically distributed employees, customers and strategic partners, integrating and on-going management of the corporation's computer networks is a major and increasing challenge.

In general, global businesses and organizations have disparate requirements for data network services. There are several approaches to solving a business' network service requirements. One approach is to interconnect a company's offices or various site locations with dedicated or private communication connections via a wide area network (WAN).

An advantage of this traditional approach to building a customized private network is that it is generally owned and managed by the corporation; management of the network along with control of computing resources, is centralized. Another advantage is improved security of the network against unauthorized access.

However, a major disadvantage of a corporate-owned and controlled private network is the extremely high total cost of procurement, design, implementation, operations, management, skill retention, and facilities related to private networks. Also, private corporate networks are oftentimes underused as the dedicated resources must be configured to handle the peak capacity requirements of the business.

In an attempt to reduce costs and enhance their competitiveness, some companies chose to deploy some business applications over the public Internet, a second approach to solving a business' network service requirements. In other words, rather than undergoing the considerable expense of constructing a private network of dedicated communication lines, some companies opt to employ the Internet to facilitate communication between various remote sites.

An advantage of using the Internet as a transport mechanism is the Internet's ubiquity; Internet access is worldwide. It is also convenient. However, a major disadvantage is that the Internet is a public network. Data propagation is indeterminate, security is relatively low and performance is not guaranteed. Electronic communications are susceptible to interception, modification and replication by third parties, essentially compromising proprietary and confidential internal corporate communications.

Because the potential business related damage resulting from security breaches and unreliable performance has become such a critical factor in network services, companies often seek an alternative solution to the Internet to obtain virtual private network (VPN) services with a high degree of security and performance assurance.

As a practical matter, there are two approaches to providing VPN services today: "on-net" or "off-net". These VPN services are generally a premium service offered by a service provider where a firm or business contracts with the service provider for a specified VPN service.

In the on-net approach, typically a service provider offers VPN service on its own network infrastructure only. An advantage of on-net service is that it does not require collaboration among multiple service providers, and generally uses standard service provider products and services only. However, a major drawback is the limited reach of a sole service provider's network. One service provider on its own often cannot offer service to corporate sites in all cases.

When a subscriber's requirements extend beyond the service provider's infrastructure, an off-net approach is used that sometimes employs the Internet to provide basic, easy-to-implement and easy-to-administer off-net capabilities. Alternatively, two or more service providers may collaborate which may involve some integration of transport networks, operations systems and business systems. Of course, a service provider may choose to extend its reach by building its own network to reach the off-net sites. But this often proves expensive.

The problem with one or more of the above-mentioned conventional approaches is difficulty of implementation. Significant time and coordination is required to arrange new service provider partnership(s), and to interconnect network(s) and/or technologies and/or configurations and/or operations systems and/or business systems. For example, a service provider must undertake to coordinate field support of off-net gateways with one or more third party groups. Additionally, the integration of operational and business systems to make the collaboration viable is complex and costly. Moreover, once set-up, the complex interconnections are difficult to change.

Another problem in one or more of the prior art approaches is the significant investment of financial resources. The cost of implementing and maintaining an off-net computer network, for example, is high. These high costs are compounded by the high costs for long distance charges for leased lines and switched services. In addition, the number of support staff necessary to manage these networks further increases the costs to manage them.

Yet another problem in one or more of the prior art approaches, particularly those that employ, in part or in whole, the Internet is non-deterministic route propagation. The route by which data communications travel from point to point over a public network, such as the Internet, can vary on a per packet basis, and is essentially indeterminate. This prevents per customer design, implementation and monitoring, essentially preventing a service being engineered to meet an individual customer's need. It also prevents differentiation between customers because per-customer state/status is not maintained throughout the Internet.

Yet another problem in one or more of the prior art approaches, particularly those that employ, in part or in whole, the Internet, is unreliable network performance. There are little or no controls in the way that users use the Internet. This generally means that one customer's use of the Internet may be adversely affected by another customer, for instance.

Yet another problem in one or more of the prior art approaches, particularly those that employ, in part or in whole, the Internet, is the low level of data security. The data protocols for transmitting information over a public network, such as the Internet, are widely known. Consequently, electronic communications over the Internet are susceptible to interception. Packets can be replicated or even modified by unauthorized users.

Yet a further problem in one or more of the prior art approaches is significant delays in restoring service to customers. A significant number of performance-related faults occur at the interface between the off-net gateway and the off-net transport service, for instance. These problems prove very difficult to resolve and, again, the extending service provider must undertake to coordinate fault resolution with the off-net transport supplier.

Yet a further problem in one or more of the prior art approaches is lack of effective monitoring to determine whether one or more service providers are providing acceptable or unacceptable service. This creates a bottleneck for proper billing, settlement, fault-finding and fault resolution.

Yet a further problem in one or more of the prior art approaches is lack of service guarantees provided to customers. Fault resolution, a service guarantee highly valued by corporate customers, is often haphazard, without procedure, based on goodwill, and of indeterminate duration. This generally results in unacceptably long delays for VPN service to be properly restored.

These and other problems are shortcomings for which there is a need to overcome.

Glossary

The detailed description of the present invention that follows may be easier understood by presentation of the following basic concepts about computer-to-computer communications and virtual private networks, in alphabetical order.

ATM (Asynchronous Transfer Mode) is a network technology capable of transmitting data, voice, audio, video, and frame relay traffic in real time. The basic unit of ATM transmission is referred to as a cell, which is a packet consisting of 5 bytes of routing information and a 48-byte payload (data).

Collocation Facility is best described as a secure facility where two or more service providers or disparate network fabrics may co-exist.

CoS (Class of Service) is a term used to refer to a category or subdivision of service, often by application type, of required quality of service performance.

CoS Mediation refers to the switch software that performs mediation between the different class-of-service mechanisms associated with the VPN types that it supports. This includes class-of-service mapping between two networks of the same VPN type that uses different class-of-service values.

EBGP (Exterior Border Gateway Protocol) is a protocol for distributing information regarding availability of the routers and gateways that interconnect networks.

End-to-end Service refers to the total service provided by an agreement between a subscriber and a provider. End-to-end service may comprise many network service sub-components in the context of a supply chain.

Frame Relay is a packet-switching protocol for use on wide area networks (WANs). Frame relay transmits variable-length packets over predetermined, set paths known as permanent virtual circuits. It is a variant of X.25 but dispenses with some of X.25's error detection and flow control for the sake of speed.

IPSec (Internet Protocol Security) generally refers to the security of the protocol standard within Transmission Control Protocol/Internet Protocol (TCP/IP) that governs the breakup of data messages into packets, the routing of packets from sender to destination network and station, and the re-assembly of packets into original data messages at the destination.

L2TP (Layer 2 Tunneling Protocol) is a set of rules or standards that governs the method of transmission of a wrapped packet. In tunneling, a packet based on one protocol is wrapped or encapsulated into a second packet based on whatever differing protocol is needed in order for it to travel over an intermediary network. This method of packet transmission is used to avoid protocol restrictions.

Martini or Kompella Draft is a document produced by the Internet Engineering Task Force (IETF) for the purpose of discussing a possible change in standards that govern the transport of Layer 2 frames over MPLS.

MPLS (Multi-Protocol Label Switching) is a communications method that uses multi-protocol labeling to establish a link or to route information between two parties. The labeling process generally involves attaching information associated with the permission level of the requesting process to an incoming or outgoing data message.

QoS (Quality of Service) is the required or desired level of network performance, often characterized by key attributes, such as bandwidth, delay, jitter, loss and the like.

SDH (Synchronous Digital Hierarchy) is a high-speed network that provides a standard interface for communications carriers in Europe to connect networks based on fiber-optic cable. It is designed to handle multiple data types such as voice, video, etc. It is an International Telecommunications Union (ITU) recommendation implemented in Europe and similar to the Synchronous Optical Network (SONET) standard used in North America and Japan.

A Virtual Circuit is a connection between communicating computers that provides the computers with what appears to be a direct link but can actually involve routing data over a defined, but longer path. A virtual circuit is not a physical entity; it is a logical entity. Multiple virtual circuits may exist across a single physical circuit.

VPN (Virtual Private Network) can be described as a wide area network (WAN) formed of permanent virtual circuits on another network, especially a network using technologies such as Asynchronous Transfer Mode (ATM), Multi-Protocol Label Switching or Frame Relay. It is also described as a set of nodes on a network (i.e. Internet) that communicate in such a way that messages are safe from interception by unauthorized users as if the nodes were connected by private lines.

X.25 is one of a set of 'X series' recommendations for standardizing equipment and protocols used in public-access and private computer networks, adopted by the International Telecommunication Union Telecommunication Standardization Sector (ITU-T) and International Organization for Standardization (ISO). It defines the connection between a terminal and a packet-switching network by incorporating three definitions: (1) the electrical connection between the terminal and the network; (2) the transmission or link-access protocol; and (3) the implementation of virtual circuits between network users. Taken together, these definitions specify a synchronous, full-duplex terminal-to-network connection.

Technologies such as X.25, Frame Relay, Asynchronous Transfer Mode (ATM), MPLS, and Internet Protocol Security (IPSec), are well known VPN technologies.

In addition to the above, in the Detailed Description Section that follows, the description is presented, in part, in terms of program procedures executed on a computer or network device or network of computers. For completeness, it is to be understood that the instant invention is equally applicable to any customary network of computers. Such networks of computers, for example, include a standard communications protocol, such as Transmission Control Protocol/Internet Protocol (TCP/IP), Open Systems Interconnection (OSI) protocol, User Datagram Protocol (UDP), Wireless Application Protocol (WAP), and/or Bluetooth wireless communications protocol, or any other network-type protocol, local and/or global.

The procedural descriptions, representations or functionalities are generally conceived to be self-consistent sequence of steps leading to a desired result. For example, each step may involve physical manipulation of physical quantities, which takes the form of magnetic signals capable of being stored, transmitted, combined, compared and otherwise manipulated.

Additionally, the manipulations performed herein, such as capturing, outputting, provisioning, monitoring, maintaining, are often referred to in terms that may be associated with mental operations performed by a human. Human capability is not necessary, or desirable in most cases, in the operations forming part of the present invention; the operations are machine operations. Devices useful for performing operations of the present invention include networking devices, general-purpose computers or such similar electronic devices.

The present invention also relates to a system for performing these operations. This system may be specially constructed for its purpose or it may comprise a general-purpose computer as selectively activated or reconfigured by a software program.

SUMMARY OF INVENTION

It is a feature and advantage of the present invention to provide a system and/or method for constructing a virtual private network that may replace expensive point-to-point WAN connections and dedicated hardware components.

It is a feature and advantage of the present invention to provide a system and/or method for constructing a virtual private network that may replace low security Internet virtual private network and/or private network services.

It is a feature and advantage of the present invention to provide a system and/or method for constructing a virtual private network that may replace unreliable performance Internet virtual private network services.

It is a feature and advantage of the present invention to provide a system and/or method for constructing a virtual private network that may replace expensive managed VPN services.

It is a feature and advantage of the present invention to provide a system and/or method for constructing a network device, usable in a virtual private network, that standardizes interconnections of one or more dissimilar service provider technologies.

It is a feature and advantage of the present invention to provide a system and/or method for constructing a network device that performs quality-of-service management functions.

It is a feature and advantage of the present invention to provide a system and/or method for constructing a network device that performs (discrete) passive and active measurement and testing throughout a network.

It is a feature and advantage of the present invention to provide a system and/or method for creating and managing an end-to-end supply chain of service providers and network operators to deliver a desired virtual private network.

It is a feature and advantage of the present invention to provide a system and/or method for constructing a virtual private network that manages the forwarding, routing and quality-of-service differences at network interconnections of disparate service providers.

It is a feature and advantage of the present invention to provide a system and/or method for constructing a virtual private network that requires minimal levels of integration among participants in the supply chain.

It is a feature and advantage of the present invention to provide a system and/or method for constructing a virtual private network that may supplement a private network by reducing the private network's load to acceptable levels.

It is a feature and advantage of the present invention to provide a system and/or method for constructing a virtual private network that may handle the introduction of user requirements in the form of new software applications without disturbing the existing configuration of the network.

It is a feature and advantage of the present invention to provide a system and/or method for constructing a virtual private network that allows systems integrators, service providers and other entities, to extend end-to-end, service level agreement-based (SLA-based) VPNs beyond their own infrastructure.

It is a feature and advantage of the present invention to provide a system and/or method for constructing a virtual private network on a per customer basis.

It is a feature and advantage of the present invention to provide a system and/or method for constructing a virtual private network that has a closed-loop control system for service delivery.

It is a feature and advantage of the present invention to provide a system and/or method for constructing a virtual private network that employs a method of agreeing and capturing the service requirements of each subscriber.

It is a feature and advantage of the present invention to provide a system and/or method for constructing a virtual private network that employs a managed router/gateway approach.

It is a feature and advantage of the present invention to provide a system and/or method for constructing a virtual private network that is easily scalable.

It is a feature and advantage of the present invention to provide a system and/or method for constructing a virtual private network that enables a single point of responsibility and accountability for delivery and performance of the network.

The present invention solves the problems in one or more of the prior art approaches and provides the above-mentioned and other features and advantages, by providing a system and method of constructing a virtual private network in such a way that minimizes the coordination, time and expense involved in producing and delivering managed virtual private networks and VPN services.

Service delivery operates on a per-network and/or per-customer basis at the granularity of each site or class-of-service or application, to monitor actual performance, which is compared to agreed/desired performance targets, thresholds and the like. Some or all of the network performance requirements may be included in contracts or service level agreements (SLAs). These performance targets indicate the level of conformance and the necessity for immediate or longer-term remedial or preventive action, if required.

The system of the present invention enables periodic re-evaluation of a customer or subscriber's network requirements and re-optimization of the delivered supply chain network solution. It also allows detailed and appropriate mapping of actual user network connectivity and performance requirements in the form of a supply chain network configuration solution design. A supply chain management module, in the form of software and processes, facilitates the design, implementation and assurance of the supply chain solution for the network.

A preferred embodiment of the architecture comprising the virtual private network of the present invention is created using packet-based data that is preferably, but not necessarily, propagated through a peering point. Alternatively and optionally, non-packet data technology, such as Layer 2 technologies (i.e. Frame Relay and ATM) or time-division multiplexing, may be used.

One or more peering points are connected to each other in a desired configuration, such as a string, where, for example, one end of the string (or strings) is connected to a corporation's headquarter office and the other end of the string (or strings) is connected to a remote satellite office. The configuration of the string or strings, stemming from one or many end points to one or many other end points, constitutes an end-to-end supply chain. In this regard, the term supply chain generally refers to the physical instantiation or configuration of a chain of suppliers comprising one or more service providers and network peering points.

Thus, in a first aspect of the present invention, a peering point is disclosed. Each peering point may be referred to as a virtual private Network Peering Point (NPP), which comprises network hardware and/or software configured in part as a VPN service performance monitoring device. Each peering point or NPP preferably employs Multi-Protocol Label Switching (MPLS) and Ethernet technology, which allows communications with similar or dissimilar VPN transport technologies. The NPP is the fundamental building block of the supply chain for the virtual private network of the present invention.

In a best mode of the present invention, each NPP is connected to one or more service providers, essentially providing multi-lateral service provider inter-connectivity. One type of inter-connectivity service involves providing connectivity between peering points. In order to facilitate the connection between two or more peering points, transit gateways are employed. Another type of inter-connectivity service involves providing connectivity between subscriber site(s) and peering point(s). Here, distribution gateways are used.

A network device for providing standardized interconnectivity in a communications network, is disclosed. The network device comprises one or more routers for propagating data through the network deterministically; one or more Ethernet switches for providing the network device with connectivity to at least one of a private or public network; one or more service creation devices for providing the network device with connectivity to an incompatible network equipment; and an operational system platform for providing communication between software and hardware components of the network device.

A network device usable in a virtual private network is disclosed. The network device comprises a pair of routers for propagating data through the network; a pair of Ethernet switches for providing the network device with VPN connectivity; a service creation device for directing at least one of data forwarding, route propagation and quality of service functions in the network device; and operating instructions for providing communication between software and hardware components of the network device.

In an end-to-end architecture for delivery of managed network service, a network device serving as a peering point of interconnection, is disclosed. The network device comprises a pair of routers for propagating data through the network; a pair of Ethernet switches for providing the network device with connectivity; programmable instrumentation for performing quality of service classification and re-marking functions in the network device; and an operating system for enabling communication between software and hardware components of the network device.

A network device that provides a substantially single interconnect scheme by one or more service providers to a communication network, is disclosed. The network device comprises at least one router; at least one switch for providing connectivity to the communications network; an instrumentation for providing at least one of quality-of-service mapping, aggregation, de-aggregation and performance testing functions between the network device and an incompatible one; and an operating system for facilitating communication between software and hardware components of the network device.

It is important to recognize that there are no restrictions on the choice of transport technology that may be used for each peering point or NPP comprising a single virtual private network across one or more service providers. For instance, employing Frame Relay on one side of the NPP and ATM on the other side, may be one combination for VPN transport. Any combination of ingress and egress VPN transport technologies is viable.

Another point of noteworthy significance is the substantial separation of routing, forwarding and protocol gateway functions within and without the NPP. This significantly increases the scalability of the invention. As earlier described, the protocol gateways are separate from the NPP to become service provider (SP) gateways. This arrangement allows a service provider to manage the gateways and their SLAs, thereby facilitating significant NPP cost reductions and effective demarcation between network services/functions provided in the supply chain.

With respect to forwarding, in accordance with a preferred embodiment of the present invention, each NPP is configured to forward subscriber traffic deterministically at substantially all times. A deterministic transport infrastructure means that the route followed by a VPN's traffic through the supply chain may be precisely configured; that is, subscriber traffic may be routed by one or more peering points to flow through a specified path. As such, the present invention provides assurances that a user's VPN traffic actually traverses a specific, and contractually bounded, set of service providers. This feature is fundamentally important to operation of the performance monitoring and closed-loop control of the supply chain. In order to design for desired performance target levels, or correct performance falling below those levels, it is necessary to identify and measure performance of subscriber paths or routed traffic.

Alternatively and optionally, in order to increase the availability of a forwarding path on the virtual private network, twin Ethernet switches are configurable at each NPP, to facilitate physical forwarding path redundancy. In a preferred embodiment of this configuration, in order to increase network availability and provide redundancy, service providers preferably peer or interconnect with two (or multiples of two) NPPs.

This configuration enables service provider-dual homing, which allows subscriber traffic to egress and ingress a service provider at a pair or multiples of pairs of NPPs. In this configuration, the pairs of NPPs are referred to as North and South NPPs, respectively. Each North and South NPP has a connection, referred to as a North and South connection, respectively, carried by participants in the supply chain, such as to another pair of NPPs or a subscriber gateway. The selection of which NPP is used at any one time to forward subscriber traffic and propagate subscriber routing, is preferably a function of the service provider's routing protocols.

The configuration of each NPP also allows for service provider MPLS Label Switched Path (LSP) protection, which results in a backup NPP-to-NPP path being selected in the event of a failure of a primary traffic path. Selection of the backup path is dynamic, and is performed by a NPP. The LSP protection is optional and in addition to the separate North and South connections between pairs of NPPs.

With respect to routing, each NPP is configurable to support a variety of route propagation methodologies for interconnecting service providers. For example, one route propagation method the NPP is configurable to support is a MPLS virtual router interconnection where one or more VPNs are interconnected using internet protocols (IP) over a single logical interface per VPN. Another method may employ a multi-hop, multi-protocol Exterior Border Gateway Protocol (EBGP), where participant service providers use a transparent layer two (L2) VPN transport mechanism.

A third and preferable route propagation option may employ Provider Edge Autonomous System Border Routers (PE-ASBR), where VPN routes are propagated to a single, multi-protocol EBGP device or router (or multiple devices or routers for redundancy).

In addition, these devices or routers are preferably centrally located in what may be termed a routing nexus. Multiple routers comprise the routing nexus, where subscriber routing information is hosted and selectively distributed to deliver virtual private networks. Preferably, two routers are dedicated to each service provider for multi-protocol EBGP route distribution. More routers may be dedicated. These routers are preferably divided between two geographically distributed and secure operations centers.

Also, creating mirrored, separate route propagation paths for all subscriber routes is likely to increase route propagation availability. Principally, there is virtually no single point of failure in the supply chain.

As described above, separation of routing and forwarding in the virtual private network essentially allows lower cost NPPs and a reduction of cost in suppliers that connect NPPs together and supply chain scaling benefits.

According to a second aspect of the present invention, a network node, usable in a virtual private network (VPN), is disclosed. The network node simplifies connection of one or more service providers to a communications network. The network node comprises a network device configured to provide standardized connectivity in the communications network, the network device arranged with a pair of gateways in substantially physical communication with the network device; more than one route propagation system, which hosts subscriber traffic; a management network, which is in connection with the network device and route propagation system, the management network facilitating operation of the network device.

In one embodiment, the VPN node comprises a NPP, a communications or management network and a route propagation system, which comprises one or more routers. The communications network interfaces and facilitates management of the NPP. The route propagation system, which operates substantially in connection with the communications network, manages and controls route propagation functions. One or more VPN nodes may comprise a virtual private network in accordance with a preferred embodiment. The preferred embodiment may be referred to as a supply chain, which comprises the configuration of one or more service providers interconnected by one or more NPPs, including at least one network node.

According to a third aspect of the present invention, a delivery system for providing substantially measurable network service, is disclosed. The delivery system capturing one or more of a user's network service requirements; outputting one or more design solutions in substantial compliance with the user's network service requirement; provisioning for implementation of a design solution, which is modifiable and which comprises at least one of network infrastructure and network services; monitoring the design solution for variation in at least one of delivery performance and usage, the monitoring being linked to the design solution agreement; and maintaining performance metrics data on the design solution, the performance metrics data usable as feedback in order to determine delivery of acceptable or unacceptable service, and usable to modify the design solution as desired.

According to a fourth aspect of the present invention, a requirement planning system for providing managed network service, is disclosed. The requirement planning system comprising a network infrastructure comprising one or more network devices capable of connectivity with one or more service providers; a management module comprising a suite of applications and hardware, useful for managing a collection of functions directed to delivery of substantially measurable network service; and a communications network for interfacing the network infrastructure with the management module.

The planning system in the form of a network requirements planning system is disclosed. The requirements planning system comprises a network infrastructure, which may comprise one or more network devices in connection with one or more service providers. Each network device is preferably constructed as an NPP.

The planning system also comprises a management module, which comprises a suite of applications and/or hardware useful for managing a collection of functions, such as assess, design, implement and assure, directed to delivery of network service. Decision support information derived for specific applications, such as assess, design, implement and assure, may be provided to customers as a service. The final component of the planning system is a communications network for interfacing the network infrastructure with the management module.

Preferably, the network requirements planning system contemplates the delivery of managed VPN services with service level agreements (SLAs) such that a subscriber has, but is not restricted to, a single point of accountability and ownership for the end-to-end virtual private network service it receives. In this regard, the system of the present invention is a highly scalable, low cost, secure solution for inter-service provider, contract-based VPN service that requires a very low level of systems integration between participants. In addition, in order that the integrity of SLA-based VPN services in the system is constantly maintained and monitored, it is preferable that all NPPs are designed and constructed in substantially the same manner, as described below.

According to a fifth aspect of the present invention, a supply chain management module is disclosed. The supply chain management module comprises an integrated data management system, a modeling tools engine, a network transformation programs engine, and a workflow engine.

Preferably, the integrated data management system comprises a universal logical structure that contains all forms of data relating to the creation and operation of the supply chain.

The logical structure stores, manipulates and integrates information from the modeling tools engine and the network transformation programs engine.

The modeling tools engine comprises one or more applications useful in assisting the development of desired modeling functions. For example, the modeling tools engine facilitates mapping of one or more network design requirements with one or more potential network providers capable of meeting a design requirement.

One such application is a supplier qualification module for facilitating supplier feasibility determinations. Another such application is a suppler contract agreement module for facilitating contract preparation.

A third component of the supply chain management module is the network transformation programs engine, which comprises assess, design, implement and assure modules.

Briefly, the assess module operates to provide an initial assessment of network requirements, including a financial evaluation of the total cost of ownership and/or return on investment of a customer adopting a supply chain solution for its VPN service.

The design module performs the functions of: capturing subscriber requirements including, for example, sites, traffic matrices and application performance requirements; modeling or formulating one or more solution options in response to a request containing the subscriber's requirements for VPN service; outputting the solution option(s); formulating one or more price quotes in response to a request containing the subscriber's requirements for VPN service; and outputting the price quote(s).

The implement module performs the functions of: generating one or more work orders derived from a chosen solution option, generally in response to a request containing a subscriber's requirements for VPN service; transmitting each work order to one or more respective service providers, which supplies sub-component VPN services and/or configures each NPP; formulating a VPN solution meeting the subscriber's requirements; testing the VPN solution; if accepted, assure the VPN solution design.

The assure module performs the functions of: monitoring substantially continuously service performance of a VPN service in such a way as to reflect the user's experience of the VPN service; generating statistical information of performance of the service; and outputting, substantially in real time, one or more service monitoring reports and/or alarms indicative of a fault condition, and/or a service agreement violation, and/or a condition in preemption of a fault condition or agreement violation. The service monitoring reports preferably include performance statistics and other network service information on trend analyses, capacity planning, billing, service problems, fault resolution, delays, service availability and the like.

Finally, a system for providing performance-based network service, is disclosed. The system comprises a portal allowing access to the system; a modeling tools engine for modeling one or more network designs; a network transformation programs engine, in communication with the modeling tools engine, for providing network support of a network design; a logical structure for storing and integrating information from the modeling tools engine and the network transformation programs engine involved in producing a network design; and a workflow engine for managing processing of the modeling tools engine, the network transformation programs engine and the logical structure, in order to facilitate implementation of the network design.

There has been outlined, rather broadly, the important features of the invention in order that the detailed description thereof that follows may be better understood, and in order that the present contribution may be better appreciated. Additional features of the present invention will be described hereinafter.

In this respect, and before explaining at least one embodiment or aspect of the invention in detail, it is to be understood that the invention is not limited in its application to the details of construction and to the arrangements of the components set forth in the following description or illustrated in the figure drawings.

The present invention is capable of other embodiments and of being practiced and carried out in a variety of ways. For example, one embodiment falling within the scope of the claims may be described as a method of procuring VPN service. The method includes, in part, the steps of capturing subscriber requirements, formulating one or more solutions based on the subscriber's requirements, and formulating one or more price quotes based on a selected solution.

In another instance, the VPNs are not limited in the number of sites or the nature of inter-connectivity between sites; in other words, the present invention is not limited to point-to-point connections. It could be any combination of connectivities, such as point to multi-point or full mesh.

The present invention is also not limited to the number of peering points or service providers, illustrated herein, used to comprise the supply chain. The number of peering points and/or service providers may reach into the hundreds, for example.

Also, it is to be understood that the phraseology and terminology employed herein are for the purpose of description and should not be regarded as limiting the invention. Those skilled in the art will appreciate that the conception, upon which this disclosure is based, may be readily used as a basis for designing other structures or infrastructures, methods and/or systems for carrying out the several purposes of the present invention and its several aspects. Therefore, it is important that the claims be regarded as including such equivalent constructions and/or structures insofar as they do not depart from the spirit and scope of the present invention.

The above features and/or advantages of the invention, together with other aspects of the invention, along with the various features of novelty that characterize the invention, are pointed out with particularity in the claims appended to and forming a part of this disclosure.

BRIEF DESCRIPTION OF PREFERRED EMBODIMENTS

FIGS. 3A, 3B and 3C are block diagrams showing various combinations of transport technologies usable with the network device of the present invention.

DETAILED DESCRIPTION OF PREFERRED EMBODIMENTS

Figure 1:
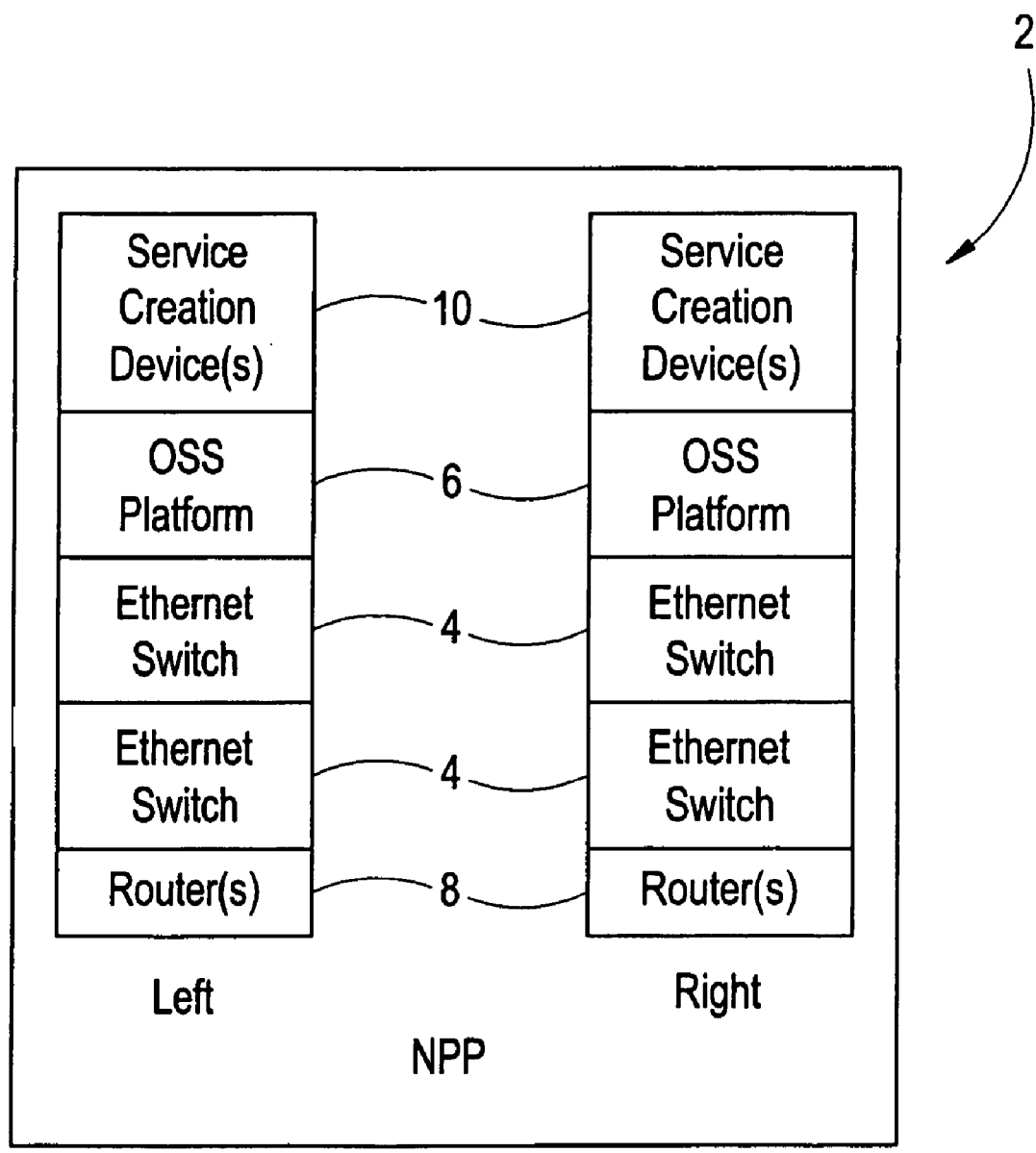
FIG. 1 is a block diagram of a configuration of a network peering point, in accordance with a preferred embodiment of the present invention.

The present invention relates to the construction, configuration, and management of a network, preferably a virtual private network (VPN) and VPN services in the form of a supply chain. A supply chain generally refers to a configuration of one or more network devices and one or more service providers interconnected together. The architecture of the VPN allows for a variety of applications.

For convenience, the description of the present invention will be explained with reference to the data environment, particularly packet-based data. Alternatively and optionally, non-packet-based data approaches, such as time-division multiplexing, are also applicable.

In accordance with the invention, a gateway is used to connect the subscriber's network environment to the VPN configuration of the present invention. It is very common that the subscriber's environment is an Internet Protocol (IP) gateway or router.

In a best mode of the invention, each NPP is connected to one or more service providers, essentially providing multilateral service provider inter-connectivity. One type of inter-connectivity service involves providing connectivity between peering points. In order to facilitate the connection between two or more peering points, transit gateways are employed.

In a preferred embodiment, each transit gateway is arranged with and preferably connected to a peering point or NPP using fast Ethernet or Gigabit Ethernet technology, or a higher speed Ethernet connection. The transit gateway, which is a network device preferably owned and/or managed by a service provider, has a NPP side and a transport side.

The NPP side of the transit gateway is substantially directly connected to the NPP. Each transit or service provider gateway operates Internet protocols over Ethernet on the NPP side. The transport side of the transit gateway is capable of connection to one or more transit gateways generally located at another NPP.

As such, on the transport side, the transit gateway is configurable to operate Internet protocols over a variety of different VPN transport technologies, such as MPLS, Frame Relay, ATM, SDH, and the like.

Another type of inter-connectivity service involves providing connectivity between subscriber site(s) and peering point (s). Here, distribution gateways are used.

In a preferred embodiment, each distribution gateway is arranged with and preferably connected to a peering point using fast Ethernet or Gigabit Ethernet technology, or a higher speed Ethernet connection.

Each distribution gateway is arranged with and connected to the NPP using fast Ethernet or Gigabit Ethernet technology. The distribution gateway, which is a network device preferably owned and/or managed by a service provider, has a NPP side and a transport side.

The NPP side of the distribution gateway is substantially directly connected to the NPP. Each distribution or service provider gateway operates Internet protocols over MPLS over Ethernet on the NPP side. The transport side of the distribution gateway is capable of connection to a subscriber's gateway, which comprises a customer's network equipment generally located at the customer's site.

As such, on the transport side, the distribution gateway is configurable to operate Internet protocols over a variety of different VPN transport technologies, such as MPLS, Frame Relay, ATM, SDH and the like. Each NPP is preferably connected to two or more routers via a management network, all of which manages and securely controls subscriber route propagation throughout the supply chain in conjunction with implementation systems.

Referring now to FIG. 1, there is shown a preferred embodiment of a configuration of a network peering point 2. Each peering point 2 may be referred to as a Network Peering Point (NPP) 2. Each NPP is preferably arranged having a left rack and a right rack. Each NPP 2 comprises network hardware and/or software, including operating instructions. Preferably, each NPP includes right and left components for redundancy.

The network hardware and/or software preferably includes two Ethernet NPP switches 4, an operating system platform 6, such as an OSS platform, one or more routers 8, localized storage (not shown), and a service creation device 10. The service creation device(s) 10 enables the NPP 2 to operate, in part, as a VPN service performance monitoring device, and for quality-of-service management between connecting service providers.

Additionally, each NPP 2 preferably employs Multi-Protocol Label Switching (MPLS) and Ethernet technology, which allows the NPP 2 to communicate with similar or different VPN transport technologies on either side of the NPP 2. Communication with different VPN technologies is achieved by a combination of a service provider gateway, for instance, and normalization to MPLS. The NPP 2 is the fundamental building block of the virtual private network of the present invention. The NPP 2 is also a fundamental component of a supply chain and delivery of the virtual private network of the present invention.

Figure 2:
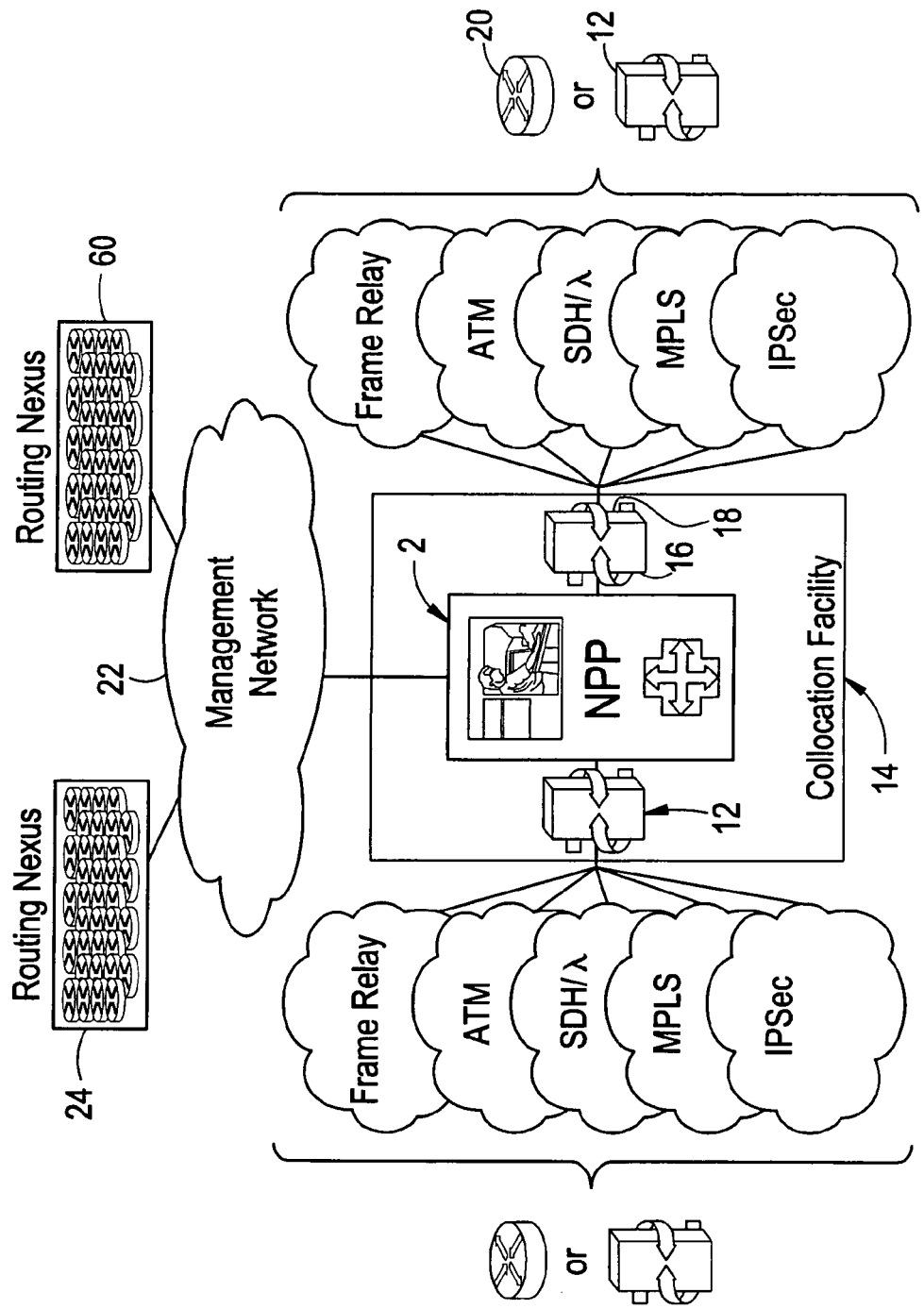
FIG. 2 is a block diagram showing a preferred embodiment of one arrangement of a VPN node as an architectural component of a virtual private network of the present invention.

Referring now to FIG. 2, there is shown a preferred embodiment of one configuration of a network node as an architectural component of the network, preferably a virtual private network, of the present invention. The principal components of the network or VPN node comprises a NPP 2, a communications or management network 22, and one or more routing nexus 24, 60.

As depicted, the NPP 2 is preferably configured with two routers or gateways 12 located on either side of the NPP 2. Alternatively or optionally, the NPP may be configured with two or more routers.

The gateways 12 may take the form of a distribution gateway or a transit gateway, depending on the nature, geographical coverage, and role of the service provider in the supply chain. A distribution service provider provides localized or national coverage, and connects to the NPP 2 via a distribution gateway. Further, a distribution service provider provides managed IP service connectivity between a subscriber gateway 20 and a NPP 2.

On the other hand, a transit service provider provides layer 2 connectivity between NPPs 2. There may be one or more distribution service providers connected to each NPP 2. There may be zero or more transit service providers connected to each NPP 2.

Referring back to FIG. 2, the NPP 2 and one or more gateways 12 may exist at a collocation facility 14, which is preferably secured. In other words, each NPP 2 is located at a collocation facility 14 where one or more distribution and/or transit service providers connect to the NPP 2 via their equipment; namely, a service provider gateway that could be a transit gateway or a distribution gateway 12.

Each distribution and/or transit gateway 12 is arranged with and connected to the NPP 2 using fast Ethernet or Gigabit Ethernet technology, or faster Ethernet technology. The gateway 12 may comprise a switch, a router, a broadband access server or the like, depending on the service provider's desired transport technology. In the preferred embodiment, a single gateway 12 satisfies the requirement for interconnectivity to the NPP 2. It is technically possible for two or more gateway devices to be used for interconnection to the NPP 2, in order to create further separation and demarcation between the service provider and NPP 2. However, this can be unnecessarily complex and expensive.

The distribution gateway 12, which is network hardware preferably owned and/or managed by a service provider, has what may be termed as a NPP side 16 and a transport side 18. The NPP side 16 of the gateway 12 is in substantially direct connection to the NPP 2. Each gateway 12 preferably operates Internet protocols and over MPLS and Ethernet on the NPP side 16.

On the transport side 18, the gateway 12 is capable of operating Internet Protocols (IP) over whatever choice of technology the service provider desires. As depicted, the choice of technologies may include, but is not limited to, Frame Relay, Asynchronous Transfer Mode (ATM), SDH, MPLS and IPSec. Accordingly, the transport side 18 is very flexible; it is capable of connection to another gateway 12, if it is a transit gateway, which indicates connectability to another peering point or NPP 2, or it is capable of connection to a subscriber's gateway 20, if it is a distribution gateway, which is generally located at the subscriber's premises, but owned and operated by a distribution service provider.

A management network hardware and/or software 22 is in substantially direct connection with each NPP 2 to facilitate operation of the NPP 2, such as, for example, in-band management, route propagation, performance statistics, configurations, and the like. Given the reliable and redundant nature of the supply chain network configuration of the present invention, substantially all connectivity to one or more remote NPPs 2 is in-band, essentially removing the need for an extensive and expensive global management network.

In addition, the present invention employs a route propagation system, depicted by one or more routing nexuses 24, 60, that manages and securely controls subscriber route propagation and distribution. The routing nexus 24, 60 operates substantially in connection with the management network 22.

It is important to re-iterate that the network device or peering point of the present invention is not limited to any one particular transport technology in its implementation and/or configuration. The network device is also vendor agnostic provided support and conformance to the device's standards and functionalities are supported as designed in a compatible manner. There are no restrictions imposed on the choice of transport technology or network equipment vendor that may be used to connect to the NPP of the present invention across one or multiple service providers.

For instance, as shown in FIG. 3A, employing Frame Relay on one side of the collocation facility 14 or NPP 2, and ATM on the other side of the facility 14, is one acceptable combination for VPN transport. Alternatively, as shown in FIG. 3B, Frame Relay may be used on both sides of the NPP 2 for VPN transport.

Figure 3C:
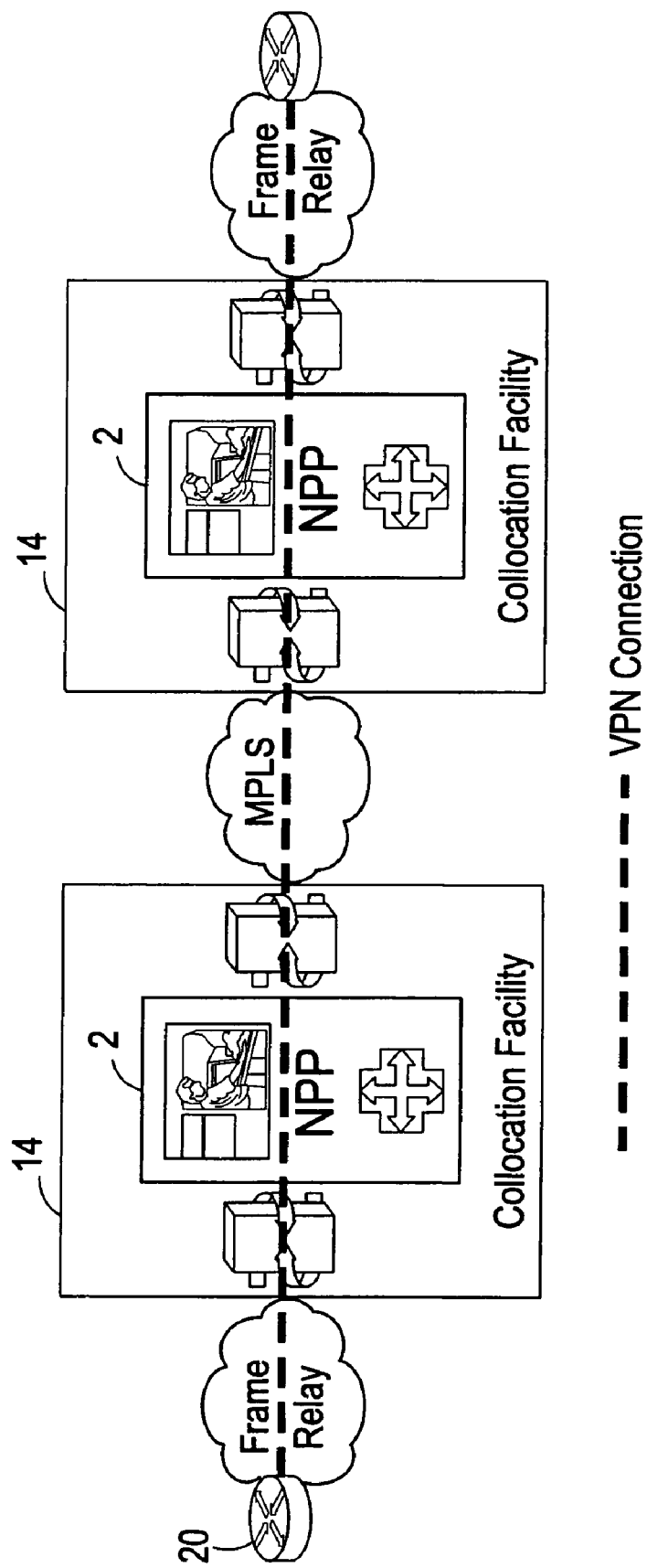

In yet another alternative, as shown in FIG. 3C, a combination of transport technologies, such as Frame Relay and MPLS, may be used to connect one subscriber's gateway 20 to another. Any combination of ingress and egress transport technologies is a viable transport mechanism between the NPPs 2 or collocation facilities 14 of the present invention. There is also no limit to the number of transit service providers involved in any point-to-point connection with a supply chain VPN.

Figure 4:
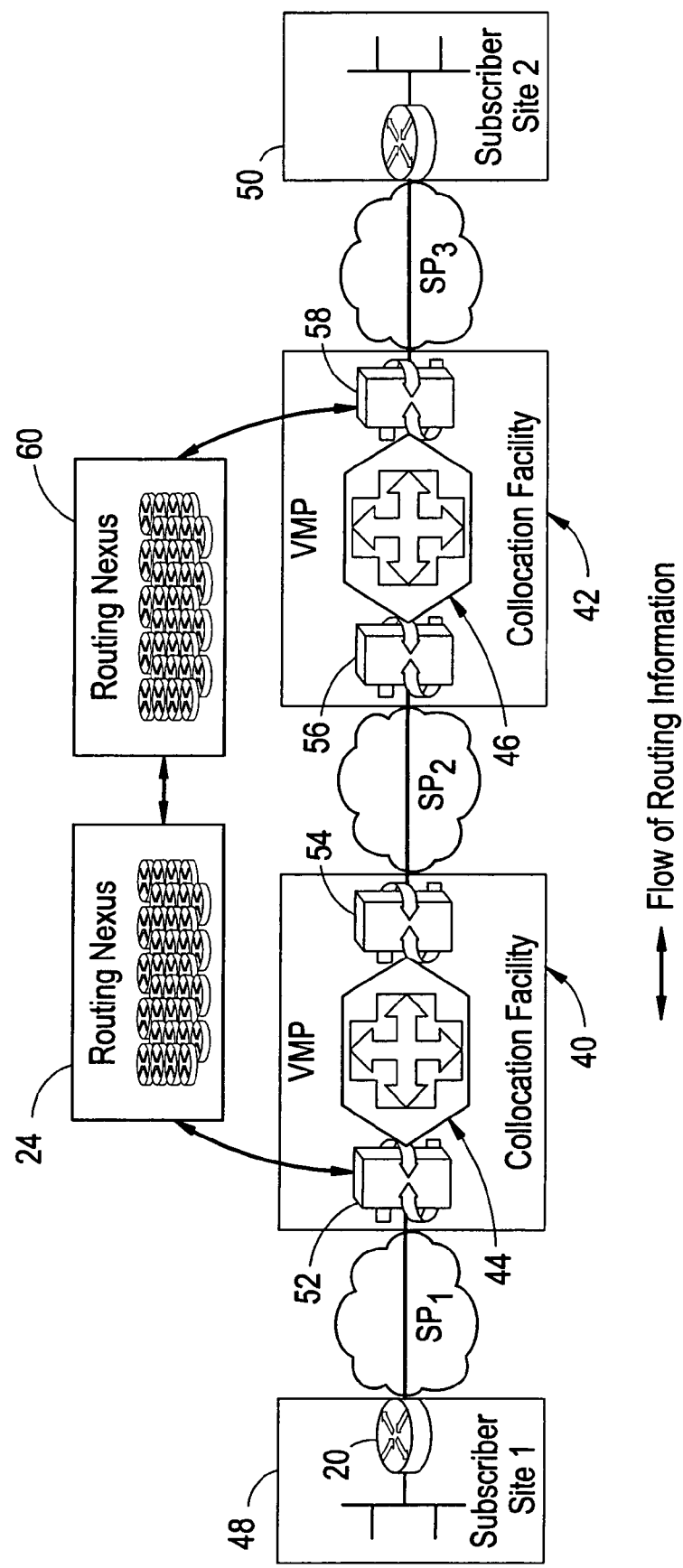
FIG. 4 is a block diagram showing a virtual private network employing the network node configuration of FIG. 2, in accordance with one embodiment of the present invention.

A preferred embodiment of the virtual private network of the present invention, which employs the network node of FIG. 2 and which is useful to interconnect service providers for service level agreement-based VPN service, is shown in FIG. 4.

As depicted, two collocation facilities 40, 42, each containing its own NPP 44, 46 respectively, are connected together via multiple service providers, $SP_1$, $SP_2$, $SP_3$ between two remote subscriber sites 48, 50. A more detailed description is provided below.

Each subscriber site 48, 50 generally comprises network equipment, including the subscriber's gateway 20, on the customer's premises. In providing VPN service from site 48 to site 50, the VPN architecture is configured to include a plurality of service providers intermediate each subscriber site 48, 50 and intermediate each collocation facility 40, 42.

More specifically, the subscriber site 48 communicates with site 50 through VPN connectivity involving $SP_1$, collocation facility 40, $SP_2$, collocation facility 42 and $SP_3$. Within each collocation facility 40, 42 are contained two pairs of gateways 52, 54, and 56, 58, respectively. Gateways 52, 54, 56, 58 may be owned and/or operated by a service provider or providers. Gateways 52, 54 are located on either side of the NPP 44 in collocation facility 40, and gateways 56, 58 are located on either side of the NPP 46 in collocation facility 42.

Preferably, gateways 52 and 58, which are in substantially direct communication with routing nexus 24, 60, respectively, are distribution gateways, so called since they are managed and/or operated by respective distribution service providers. Additionally, gateways 56 and 58, which connect the two collocation facilities 40, 42, are transit gateways, so called since they are managed and/or operated by transit service providers.

As depicted in FIG. 4, the distribution gateway 52 presents one or more transport interfaces on the transport side, toward the service provider $SP_1$, and provides Virtual Local Area Network (VLAN) Ethernet interfaces on the NPP side, toward the NPP 44. The main properties of the gateway 52 are protocol conversion, forwarding and route propagation. Preferably, the gateway 52 uses BGP route propagation.

The NPP 44, like the NPP 46, is preferably owned and/or operated by a NPP Operator, and includes Ethernet switches 4 (FIG. 1) used to interconnect gateways 52, 54, for example. NPP switches 4 are used to establish connection-oriented paths between collocation facilities 40, 42.

The main properties of the NPP Ethernet switches 4 are forwarding, tunneling and MPLS traffic engineering. These switches provide one or more Ethernet transport interfaces to the gateways 52, 54 as appropriate, and maps VLANs and other virtual path mechanisms to MPLS Label Switched Paths (LSPs). A range of Layer 2 VPN transport mechanisms, such as ATM or Frame Relay, may be used by service providers $SP_1$, $SP_2$, $SP_3$, for their part of the forwarding path in the virtual private network. These service provider connections appear as logical point-to-point circuits to the NPP switches 4.

The transit gateway 54, like the gateway 56, is likely owned and/or operated by the service provider $SP_2$. The main properties of the gateway 54 (and gateway 56) are protocol conversion and forwarding. Preferably, transit gateways 54, 56 do not perform route propagation. Transit gateway 54 provides one or more transport interfaces to the service provider $SP_2$ on the transport side, as well as VLAN Ethernet interfaces to the NPP 44 on the NPP side.

The above explanation is similar for the collocation facility 42, with the exception that the gateways 54, 56 are likely owned and/or operated by the service provider $SP_2$.

The routing nexus 24, 60 are in substantially constant communication with the distribution gateways 52, 58 at the collocation facility 40, 42. Together, the routing nexuses 24, 60 acts as a dual redundant cluster of border routers where at least one router in each nexus 24, 60 is dedicated to and operates in conjunction with each service provider gateway and supports route propagation in accordance with conventional techniques.

Figure 5:
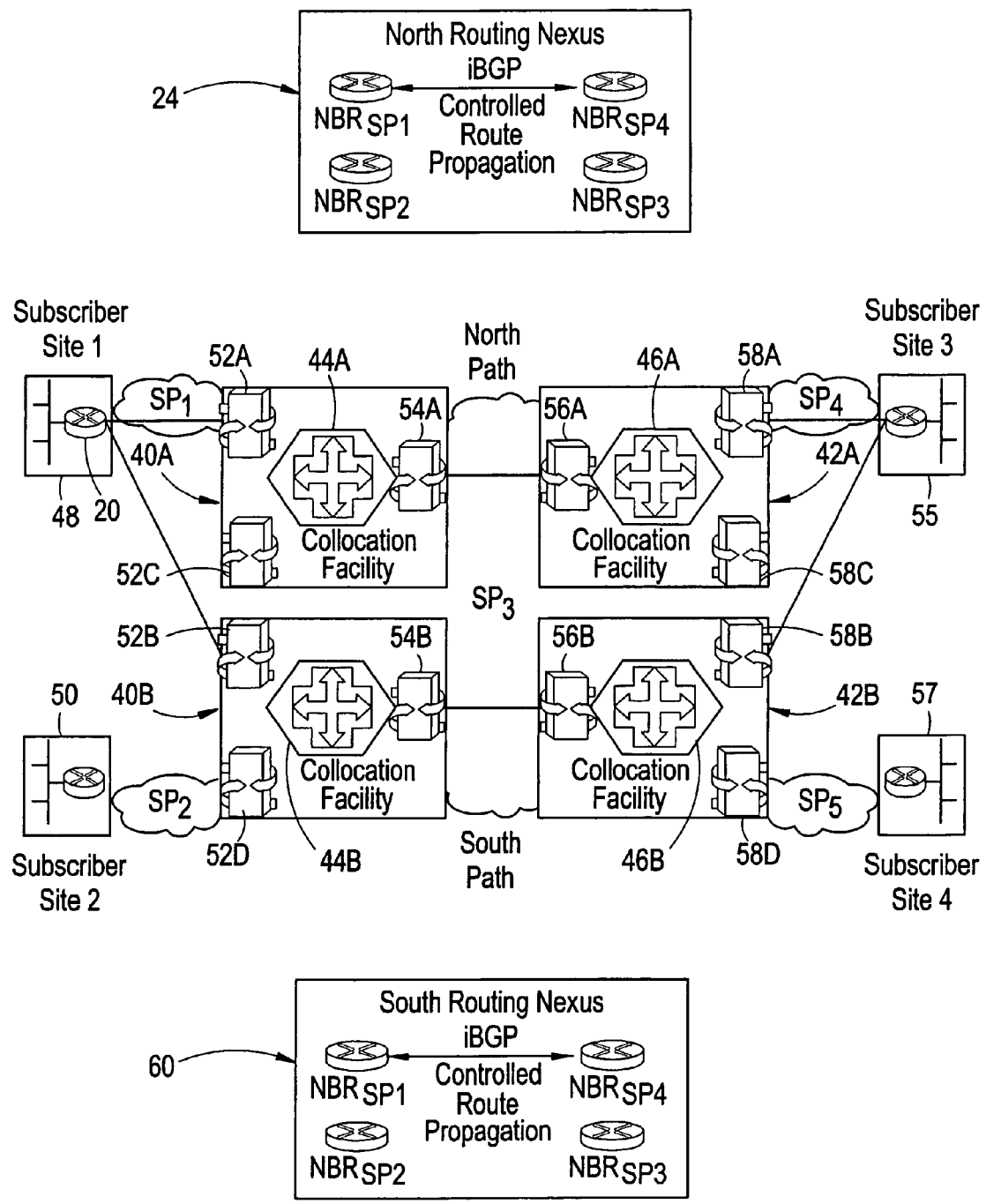
FIG. 5 is a block diagram showing a virtual private network employing an alternate network node configuration.

Referring now to FIG. 5, there is shown a virtual private network employing an alternate network node configuration, in accordance with another embodiment of the present invention. In this instance, the network node configuration shows each collocation facility 40A, 40B, 42A, 42B as housing three gateways as oppose to two gateways, as depicted in FIG. 4. This configuration illustrates the multiple forms of duality exhibited by the present invention. Within each NPP there are also redundant Ethernet switches to further increase network availability and redundancy.

As depicted, four collocation facilities 40A, 40B, 42A, 42B, each containing its own NPP 44A, 44B, 46A, 46B, respectively, are connected together via multiple service providers, $SP_1$, $SP_3$, $SP_4$ between two remote subscriber sites 48, 55. Generally, there is no limit to the number of peering points and/or distribution service providers and/or transit service providers in a supply chain VPN. Nor is there any limit to the number of service providers attachable to each peering point. A more detailed description is provided below.

Each subscriber site 48, 55 generally comprises network equipment, including the subscriber's gateway 20, on the customer's premises. In providing VPN service from site 48 to site 55, for instance, the VPN architecture is configured to include a plurality of service providers intermediate each subscriber site 48, 55 and intermediate each collocation facility 40A, 40B, 42A, 42B. The plurality of service providers and NPPs 44A, 44B, 46A, 46B constitutes a supply chain.

More specifically, the subscriber site 48 communicates with site 55 through VPN connectivity involving SP1, collocation facility 40A, 40B, $SP_3$, collocation facility 42A, 42B and $SP_4$. Within collocation facility 40A, there are two distribution gateways 52A, 52C. Service provider $SP_1$ is connected to distribution gateway 52A, which provides connectivity to the North path. Observe that distribution gateway 52C is currently not in use in this example, although it could be used to provide dual homing for service provider $SP_2$.

Within collocation facility 40B, there are also two distribution gateways 52B, 52D. Service provider $SP_1$ is connected to distribution gateway 52B, which provides connectivity to the South path. Observe that distribution gateway 52D is used by service provider $SP_2$ not participating in the illustrated VPN connection.

Further, within collocation facility 42A, there are the two distribution gateways 58A, 58C. Here, service provider $SP_4$ is connected to the distribution gateway 58A, which provides connectivity to the North path. Observe that distribution gateway 58C is currently not in use in this example, although it could be used to provide dual homing for service provider $SP_5$.

Finally, within collocation facility 42B, there are shown the two distribution gateways 58B, 58D. Service provider $SP_5$ is connected to the distribution gateway 58B, which provides connectivity to the South path. While the distribution gateway 58D is used by service provider $SP_5$, it is not participating in the illustrated VPN connection.

Gateways 52A, 52B, 52C, 52D, 54A, 54B, 56A, 56B, 58A, 58B, 58C, 58D are preferably owned and/or operated by the appropriate distribution and/or transit service provider. Gateways 52A, 54A, and 52B, 54B, are located on either side of the NPP 44A, 44B in collocation facility 40A, 40B, respectively, and gateways 56A, 58A, and 56B, 58B are located on either side of the NPP 46A, 46B in collocation facility 42A, 42B, respectively.

This configuration provides redundant north/south connectivity between the subscriber site 48 and the supply chain through NPPs 44A, 44B. The subscriber site 48 is connected by $SP_1$ to a north NPP 44A and a south NPP 44B located in two geographically separate collocation facilities 40A, 40B, respectively.

As to route propagation, the routing protocols of service provider $SP_1$ dynamically determines subscriber data packets flowing from site 48 to site 55. Similarly, by $SP_4$ routing protocols essentially determines the connection used for subscriber data packets flowing from site 55 to site 48.

Preferably, gateways 52A, 52B, 58A, 58B, which are in substantially direct communication with routing nexus 24, 60, respectively, are distribution gateways. Additionally, gateways 54A, 54B, 56A, 56B are transit gateways.

As depicted in FIG. 5, the distribution gateway 52A, 52B presents one or more transport interfaces on the transport side, toward the service provider $SP_1$, and provides Virtual Local Area Network (VLAN) Ethernet interfaces on the NPP side, toward the NPPs 44A, 44B. The main properties of the gateways 52A, 52B are protocol conversion, forwarding and route propagation. Preferably, the gateway 52A, 52B uses BGP route propagation.

The NPPs 44A, 44B, like the NPPs 46A, 46B, are preferably owned and/or operated by an NPP Operator, and includes Ethernet switches 4 (FIG. 1) used to interconnect gateways 52A, 54A, and 52B, 54B, respectively, for example. NPP switches 4 are used to establish connection-oriented paths between collocation facilities 40A, 40B, 42A, 42B and across participant service providers, such as $SP_3$.

To reiterate, the above-mentioned configuration evidences the plurality of network redundancy of the present invention. As part of the supply chain, there is a north path between transit gateways 54A, 56A, and a south path between transit gateways 54B, 56B. Generally, subscriber traffic may be load-shared across these two connections. In the event of a failure of either of these paths, substantially all subscriber traffic is rapidly switched to the other available path.

A noteworthy observation is the use of dynamic layer 3 routing protocols between NPPs across layer 2 technologies. Such use does not perform routing distribution functionalities for the supply chain, as this is handled by the routing nexus 24, 60. Instead, such use is employed to detect substantially any failure in network connectivity.

A further alternative or option for additional network reliability is the use of MPLS Label Switched Path (LSP) protection where, for example, the service provider SP3 provides a primary connection and a secondary (backup) connection. These connections are presented to the NPP Ethernet switch by the transit gateways 54A, 56A and/or 54B, 56B as to two different interfaces. The NPP Ethernet switch may then switch between these two connections as required.

As earlier described, the main properties of the NPP Ethernet switches 4 are forwarding, tunneling and MPLS traffic engineering. These switches provide one or more Ethernet transport interfaces to the gateways 52A, 52B, 54A, 54B as appropriate, and maps VLANs and other virtual path mechanisms to MPLS Label Switched Paths (LSPs). A range of Layer 2 VPN transport mechanisms, such as ATM or Frame Relay, may be used by service providers $SP_1$, $SP_2$, $SP_3$, $SP_4$, $SP_5$ for their part of the forwarding path in the virtual private network. These service provider connections appear as logical point-to-point circuits to the NPP switches 4.

The transit gateways 54A, 54B, like the gateways 56A, 56B, are likely owned and/or operated by the service provider $SP_3$. The main properties of the gateways 54A, 54B (and gateways 56A, 56B) are protocol conversion and forwarding. Preferably, the transit gateways do not perform route propagation. Transit gateways 54A, 54B provide one or more transport interfaces to the service provider $SP_3$ on the transport side, as well as VLAN Ethernet interfaces to the NPPs 44A, 44B on the NPP side.

The above explanation is similar for the collocation facility 42A, 42B.

The routing nexus 24, 60 are in substantially constant communication with the distribution gateways 52A, 52B, 58A, 58B at the collocation facility 40A, 40B, 42A, 42B, they respectively support. For redundancy to increase availability of route propagation in the supply chain, as shown, both routing nexus 24, 60 are arranged to operate with the distribution gateways 52A, 52B, 58A, 58B. Preferably, each routing nexus 24, 60 contains a redundant cluster of border routers where at least one router in each nexus 24, 60 is dedicated to each service provider and supports route propagation in accordance with conventional techniques.

VPN transport between NPPs 44A, 44B, 46A, 46B is accomplished using a layered approach to network architecture that leads to the isolation of functions in a system and assignment of standard rules (protocols) to govern their operations. This modular design makes each layer relatively self-contained, such that changes to the network and isolation of problems become much simpler when the functions of each hardware and software element are clearly defined by a layer of protocol.

Figure 6:
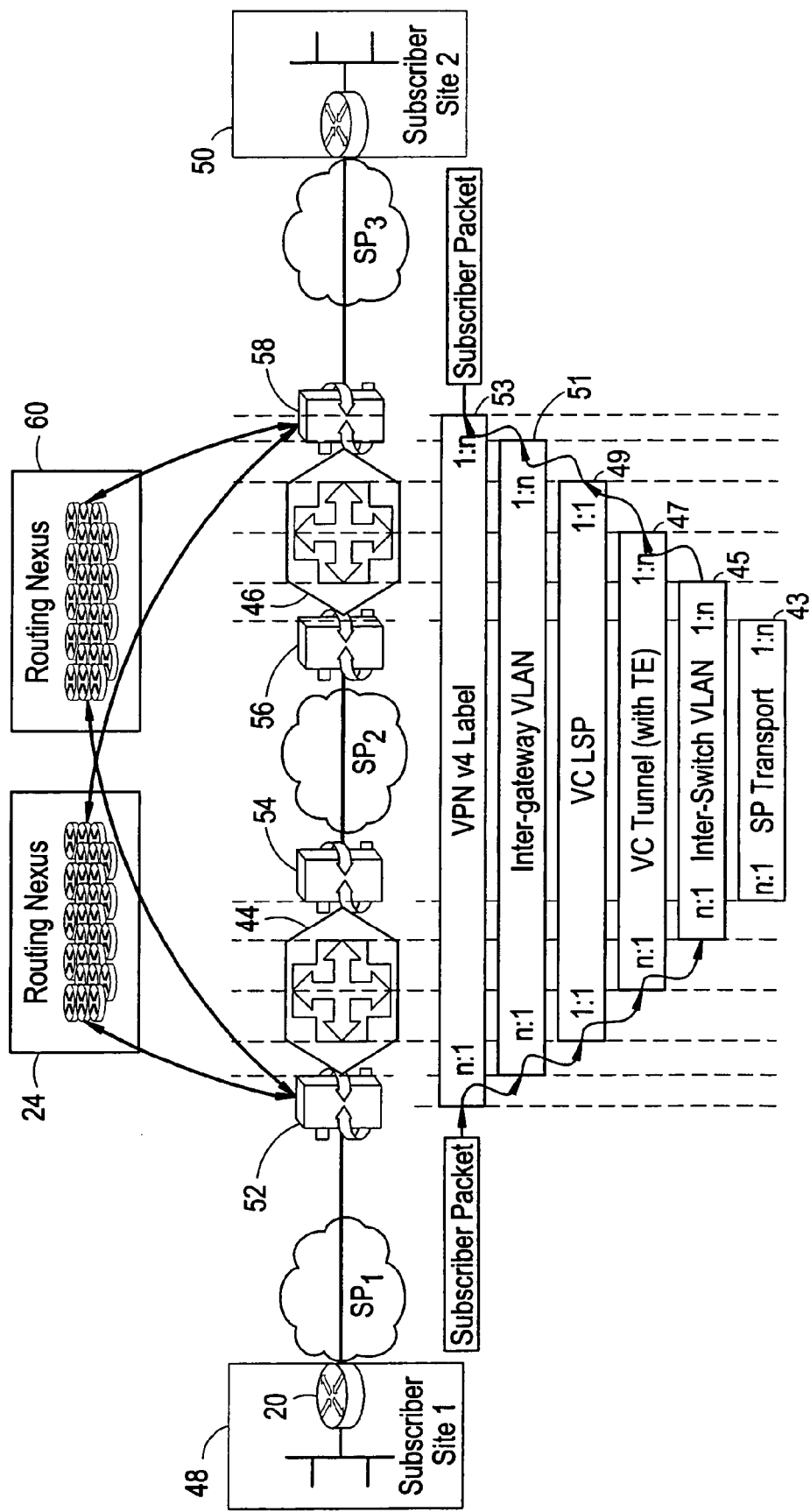
FIG. 6 is a block diagram showing one embodiment of the layers of encapsulation or a forwarding path model of the present invention.

For example, FIG. 6 shows a preferred embodiment of a hierarchy or layered approach of encapsulations and mapping between distribution gateways 52, 58 (of FIG. 4). At each encapsulation level 43 through 53, FIG. 6 exemplifies a forwarding path model, which allows for $SP_2$ to provide inter-NPP transport between NPP 44 and NPP 46. At each encapsulation layer, multiplexing may occur on an n-to-1 ratio, or it may comprise one-to-one mapping.

Preferably, at layer 43, $SP_2$ provides Layer 2 transport presented at the peering points 44, 46 through the transit gateways 54, 56, respectively. This Layer 2 transport is usable to "carry" multiple inter-switch Virtual Local Area Network (VLAN) tunnels, as at layer 45. The inter-switch VLAN tunnel is a Virtual Local Area Network (VLAN) established between peering points 44, 46 switches to carry, for example, the Martini tunnels. 'n' multiple VLANs may be multiplexed into a single Layer 2 path between peering points 44, 46.

In one instance, the IETF Martini or Kompella draft is used to create a Multi-Protocol Label Switching (MPLS) Layer Switched Path (LSP) Virtual Circuit (VC) Tunnel between NPP 44 and NPP 46 using explicit path traffic engineering, as indicated by layer 47. This configuration provides the required deterministic forwarding path followed by subscriber traffic between NPPs 44, 46 within the supply chain. Preferably, the deterministic forwarding using this mechanism is invoked across an unlimited string of NPPs. The MPLS LSP VC Tunnel may be used to "carry" multiple MPLS LSP virtual circuits. Additionally, any number of MPLS LSP virtual circuits may be multiplexed indirectly into an inter-switch VLAN.

The IETF Martini draft has a further level of encapsulation that identifies the virtual circuit between distribution gateways 52, 58 that is carried by the Martini Tunnel. Here, the VLANs are mapped one-to-one into a virtual circuit (VC) LSP, as at layer 49.

Preferably, a VLAN is used for each VPN that is 'carried' between distribution gateways 52, 58. This VLAN comprises the inter-gateway VLAN, shown at layer 51. There is a one-to-one relationship between one or more VPNs and the inter-gateway VLANs.

Finally, at layer 53, subscriber traffic is encapsulated at the distribution gateways 52, 58 by Multi-Protocol Label Switching (MPLS) VPN v4 labels. Each MPLS VPN v4 label, and consequently each VPN (or portion of a VPN), is mapped to a Virtual Local Area Network (VLAN) between the gateways 52, 58. Accordingly, Internet Protocol (IP) traffic from one or more subscriber sites are mapped to MPLS VPN v4 labels at the distribution gateways 52, 58 to identify the appropriate VPNs.

It is important to re-iterate that in accordance with FIG. 6, many VPNs may be multiplexed into an inter-gateway VLAN, thereby enabling a single VLAN to "carry" a plurality of virtual private networks between $SP_1$ and $SP_3$ in a single VLAN.

Preferably, a VLAN is mapped in a one-to-one ratio to a virtual circuit LSP. However, many virtual circuit LSPs may be mapped to a virtual circuit tunnel, and many virtual circuit tunnels may be mapped to an inter-switch VLAN, thereby allowing transit service provider SP2, for example, to carry many VLANs between many distribution service providers in a single VLAN. This arrangement results in an operationally scalable forwarding mechanism for the service provider $SP_2$, where many VPNs may be carried for many service providers within deterministic traffic-engineered VC tunnels all within a single VLAN. When there are multiple transit service provider hops in a supply chain, as discussed above, the tunnels of layers 47, 49, 51, 53 may persist end-to-end between distribution gateways 52, 58.

Again, the VPN transport between subscriber sites, such as sites 48, 50 is a choice for each service provider, $SP_1$, $SP_2$, $SP_3$ participating in the supply chain. The SP gateways, such as gateways 52, 54 perform a protocol gateway function between the chosen transport technologies of $SP_1$ and $SP_2$ and Ethernet for intra-NPP 44 transport.

For example, the VPN transport technology employed by service provider $SP_1$ between the subscriber site 48 and the peering point 44 is the choice of service provider $SP_1$. Similarly, the transport technology between the subscriber site 50 and the peering point 46 is the choice of service provider $SP_3$. The distribution gateways 52, 58 provide protocol conversion between the chosen VPN technologies of service providers $SP_1$ and $SP_3$, and the inter-NPP transport technology of MPLS.

Furthermore, if a (transit) service provider desires to use MPLS as the transport technology between transit gateways 54, 56, additional levels of mapping and encapsulation are possible. A single MPLS LSP in the transit network may be used to provide the L2 transport for connections between any two NPPs, each of which indirectly 'carries' traffic for multiple VPNs. This configuration provides an augmented level of scalability and operational simplicity for the (transit) service provider.

Route propagation between distribution gateways 52, 58 is enabled by the routing nexus 24, 60, respectively. Route propagation is implemented, in part, using conventional techniques and proprietary route propagation management configuration(s) (developed by the inventors), which allows a service provider to only receive the route(s) it needs. In one embodiment, each routing nexus 24, 60 is preferably equipped with at least one border router per service provider.

Various route propagation techniques for interconnecting service providers may be used in the virtual private network of the present invention. Combined with static MPLS label and IP address mapping configuration, the network architecture of the present invention may support, for example, three inter-service provider routing techniques.

For instance, one propagation technique employs a MPLS virtual router interconnection, such as VPN Routing and Forwarding (VRF) to VRF, where two or more virtual private networks are interconnected using internet protocols over a single logical interface. This technique is generally suitable for ATM/Frame Relay interconnect at the NPP 44, 46, for example, but using MPLS interfaces rather than internet protocol interfaces.

The architecture of the present invention may also support a second route propagation technique referred to as a multi-hop, multi-protocol Exterior Border Gateway Protocol (EBGP), where participants use a transparent Layer 2 transport mechanism to multi-protocol EBGP connections among all MPLS router devices or participant VPN route reflectors. In other words, the present invention may facilitate a transparent Layer 2 infrastructure to service providers so that these providers may establish multi-protocol exterior border gateway protocol sessions between all provider edge devices or service provider VPN route reflectors.

However, there is a major disadvantage to employing these propagation techniques: namely, substantially no scalability as it would require considerable configuration between originating and terminating service providers, unique internet protocol addressing between domains, and additional security required on routers at the edge of each service provider network used to interconnect to another service provider's domain.

A third route propagation technique employs Provider Edge—Autonomous System Border Routers (PE-ASBR). These routers employ EBGP to re-distribute labeled VPN v4 routes from Autonomous System (AS) to AS.

For operational scaling and security reasons, an Autonomous System Border Router (ASBR) approach to route propagation is the preferred methodology. Under this approach, VPN routes are propagated through a single, multi-protocol exterior border gateway protocol device or devices (for redundancy) from which routes are passed, under desired control, only to service providers that need to receive them, based on VPN participation. Employing this technique greatly reduces the configuration and complexity of the virtual private network.

As to the scalability of the virtual private network of the present invention, because routing and forwarding functions are separated within each NPP 2, the VPN of the present invention is easily scalable to support both increases in the number of VPNs created as well as increasing subscriber bandwidth demands.

As to security of the VPN of the present invention, dedication of router(s) to each service provider serves to minimize the probability of a service provider flooding a multi-protocol EBGP session with flapping or invalid routes, for example. Because these routers only learn routes appropriate to the associated service provider, the need for per-service provider access lists, in order to filter routes not destined for the associated service provider's network, is thus eliminated. Also, static MPLS labels add to the security of the forwarding path. Additionally, there is substantially no layer 3 addressable component intermediate within the supply chain, another attribute that provides additional isolation and, consequently, security. These advantages may be better appreciated with reference to the next embodiment discussed below.

In another embodiment, while referring to FIG. 6, for example, at least two routers are dedicated to each service provider $SP_1$, $SP_3$ for multi-protocol Exterior Border Gateway Protocol (EBGP) route distribution. In this embodiment, multiple routers form each routing nexus 24, 60. These routers preferably have secure, private in-band connections to distribution gateways 52, 58, for example, which perform the Provider Edge Autonomous System Border Router (PE-ASBR) function. Also, each distribution gateway 52, 58 preferably has dual multi-protocol EBGP sessions to geographically separate border routers, which may be located in the dual geographically distributed routing nexuses.

Figure 7:
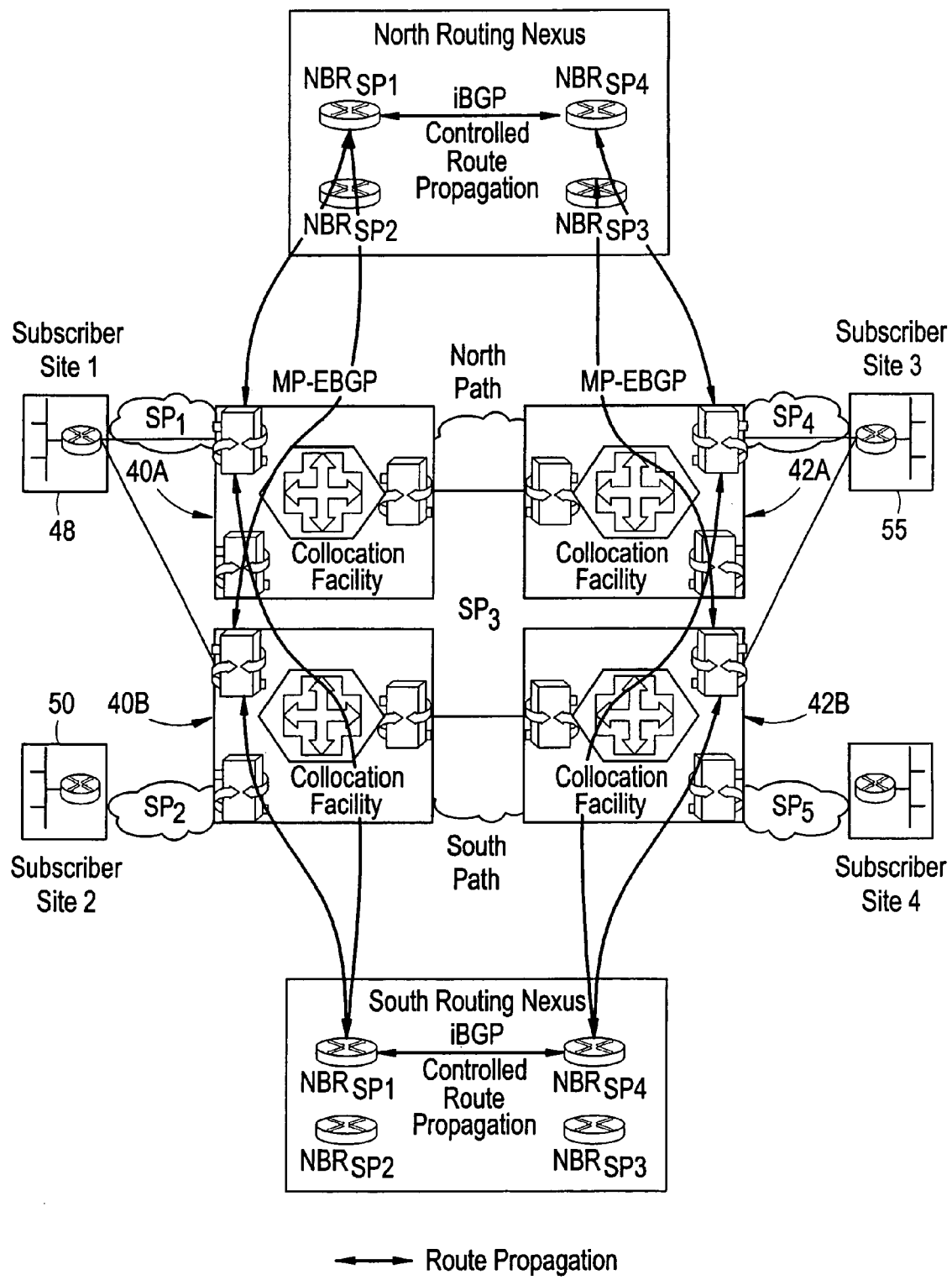
FIG. 7 is a flow diagram showing route propagation and data forwarding paths through one configuration of a VPN architecture of the present invention.

A visual presentation of how route propagation and data forwarding is effected through the VPN architecture of the present invention, may be instructive with reference to FIG. 7.

By way of overview, FIG. 7 is a flow diagram showing route propagation and data forwarding through the VPN architecture of FIG. 6. More specifically, it describes how subscriber routing information propagates end-to-end, from subscriber site 48 to site 55. An underlying principle shown here is the separation of the routing tasks from the forwarding tasks. This routing and forwarding architecture optimizes the VPN and service provider scalability, security and costs.

In the embodiment depicted in FIG. 7, the virtual private network connects subscriber sites 48 and 55 across three service providers $SP_1$, $SP_3$, $SP_4$ and four NPPs 44A, 44B, 46A, 46B, which are preferably housed at collocation facilities, such as carrier hotels.

The route propagation path for routing information through the virtual private network begins at the subscriber site 48. Here, local routing information propagates through $SP_1$'s routing protocol to distribution gateways 52A, 52B. Routing information flows from the distribution gateways 52A, 52B to other distribution gateways 58A, 58B, respectively, via the routing nexus 24, 60 using a Border Gateway Protocol (BGP) route distribution mechanism.

Preferably, within each routing nexus 24, 60, the distribution of routing information is carefully controlled, so that only service providers participating in each VPN actually receives the routing information they require. Finally, subscriber site 48 local routing information is propagated through $SP_4$'s routing protocols from distribution gateways 58A, 58B to subscriber site 55. Propagation of subscriber site's 55 local routing information to subscriber site 48 occurs in a similar fashion.

Creating mirrored separate route propagation paths for all subscriber routes heightens route propagation availability.

Figure 8A:
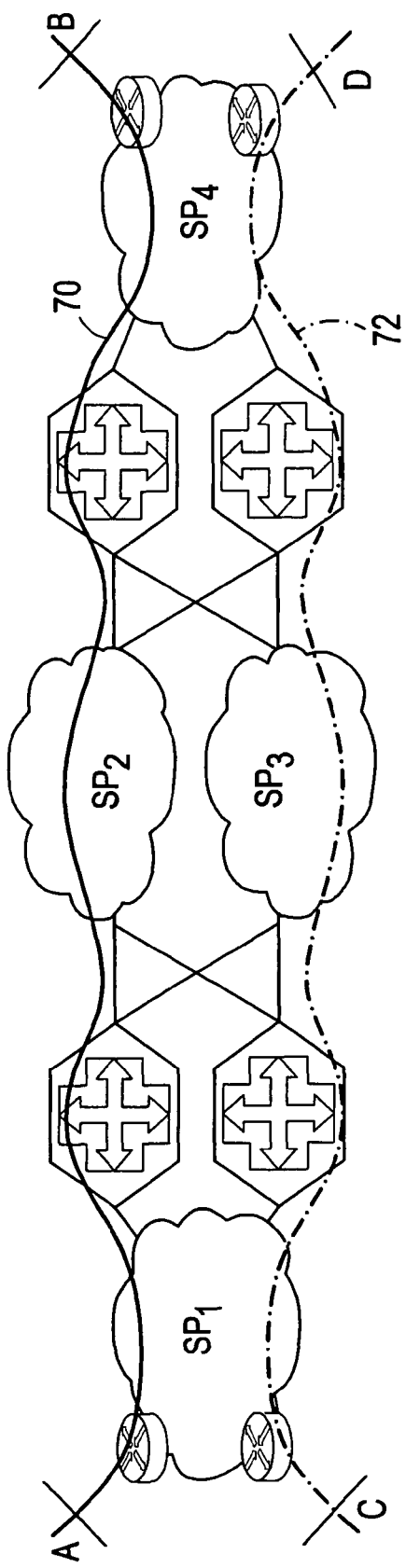
FIGS. 8A, 8B and 8C show various approaches for forwarding subscriber traffic, in accordance with the present invention.
Figure 8B:
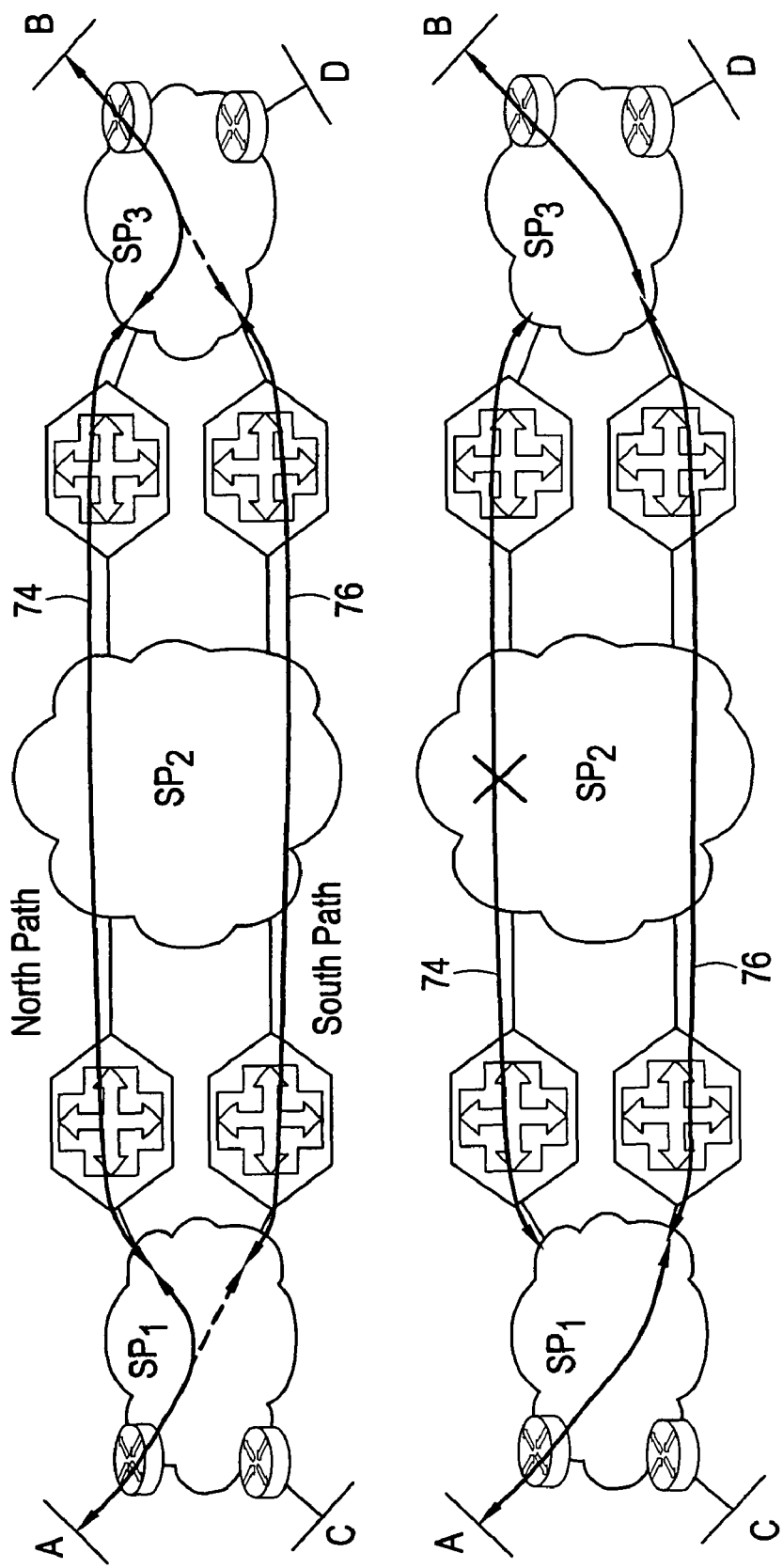
Figure 8C:
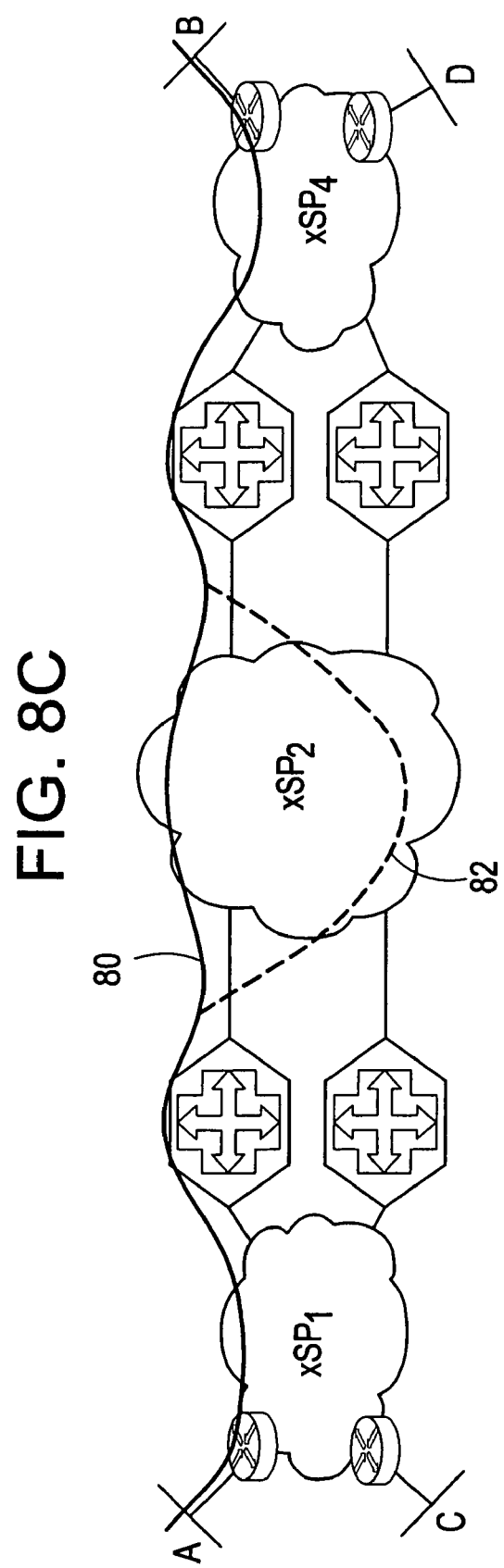

FIGS. 8A, 8B and 8C are flow diagrams showing details for the forwarding of subscriber traffic. FIG. 8A shows deterministic connections for two different networks, one flowing from site A to site B, and another flowing from site C to site D.

In accordance with a preferred embodiment, as depicted in FIG. 8A, each NPP is configured to forward subscriber traffic deterministically at substantially all times. Network 70 is a fairly straightforward deterministic connection between site A and site B. Similarly, network 72 is a point-to-point deterministic connection between site C and site D.

Deterministic forwarding allows subscriber data to be traffic-engineered using MPLS traffic engineering by the peering points or NPPs to traverse a specified sequence of NPPs. In other words, the deterministic transport infrastructure of FIG. 8A means that the route followed by a VPN's traffic may be precisely configured to flow across a specified sequence of distribution service providers, NPPs and transit service providers. As depicted, the virtual private network 70 uses service providers $SP_1$, $SP_2$, $SP_4$, while the network 72 uses service providers $SP_1$, $SP_3$, $SP_4$.

The deterministic forwarding feature of the present invention is important for several reasons. First, as part of the supply chain design 188 and implement 190 process and set of tools (FIG. 11), appropriate service providers become contractually bound to carry specific VPN traffic. Accordingly, it is essential that these service providers, and only these service providers, are in the forwarding path for that subscriber traffic for a given VPN.

Secondly, as part of the assure 192 process and set of tools (FIG. 11), it is important for the operation of the closed-loop control mechanism that the precise path taken by subscriber traffic be known. More specifically, the synthetically generated test packets of the assure program 192 must follow the same path as subscriber traffic in order to correctly detect whether that subscriber is receiving acceptable or unacceptable service, and, in particular, which service providers or suppliers are responsible for the acceptable or unacceptable service. Should the assure program 192 detect an incident of non-compliance to agreed network service performance levels, in the form of contracts and/or SLAs or a deterioration in performance beyond some threshold, it is necessary to be able to precisely identify the problematic supplier and take remedial or preventive action. It is also necessary to be able to accurately report contractual conformance or non-conformance.

Additionally and/or alternatively, subscriber traffic may be forwarded through the VPN of the present invention by using the parallel forwarding path options depicted in FIG. 8B. For instance, the dual homing option of FIG. 8B allows subscriber traffic to egress a service provider at two or more NPPs. The selection of which NPP is used at any one time is a function of the distribution service provider's routing protocol(s). Preferably, subscriber traffic may be load-balanced across the two parallel connections.

In an instance of a network failure in the transit network 74 of $SP_2$, the failure is detected at the distribution gateways, by way of the above-described layer 3 routing protocols (between the distribution gateways across the layer 2 transport between the distribution gateways). As a result, the distribution gateways, which forwards traffic over failed connection 74, stops advertising any associated routes associated with sites A, B into their respective distribution service providers $SP_1$, $SP_3$. Hence, the routing protocols within the distribution service providers $SP_1$, $SP_3$ detects the withdrawal of advertised routes and then forward all subscriber traffic via the remaining unaffected NPPs across transit path 76.

The Label Switched Path (LSP) protection option of FIG. 8C results in a backup NPP-to-NPP path 82 for selection in the event of failure of a primary path 80. Selection, which may be predetermined, is dynamic and occurs substantially instantaneously.

In addition, the NPP of the present invention is configured so that minimal depth queues may develop within its Ethernet switches, thereby ensuring a negligible likelihood that subscriber packets are dropped during NPP transit, and thereby substantially ensure that the subscriber's end-to-end service remains unaffected by the NPP.

Figure 9:
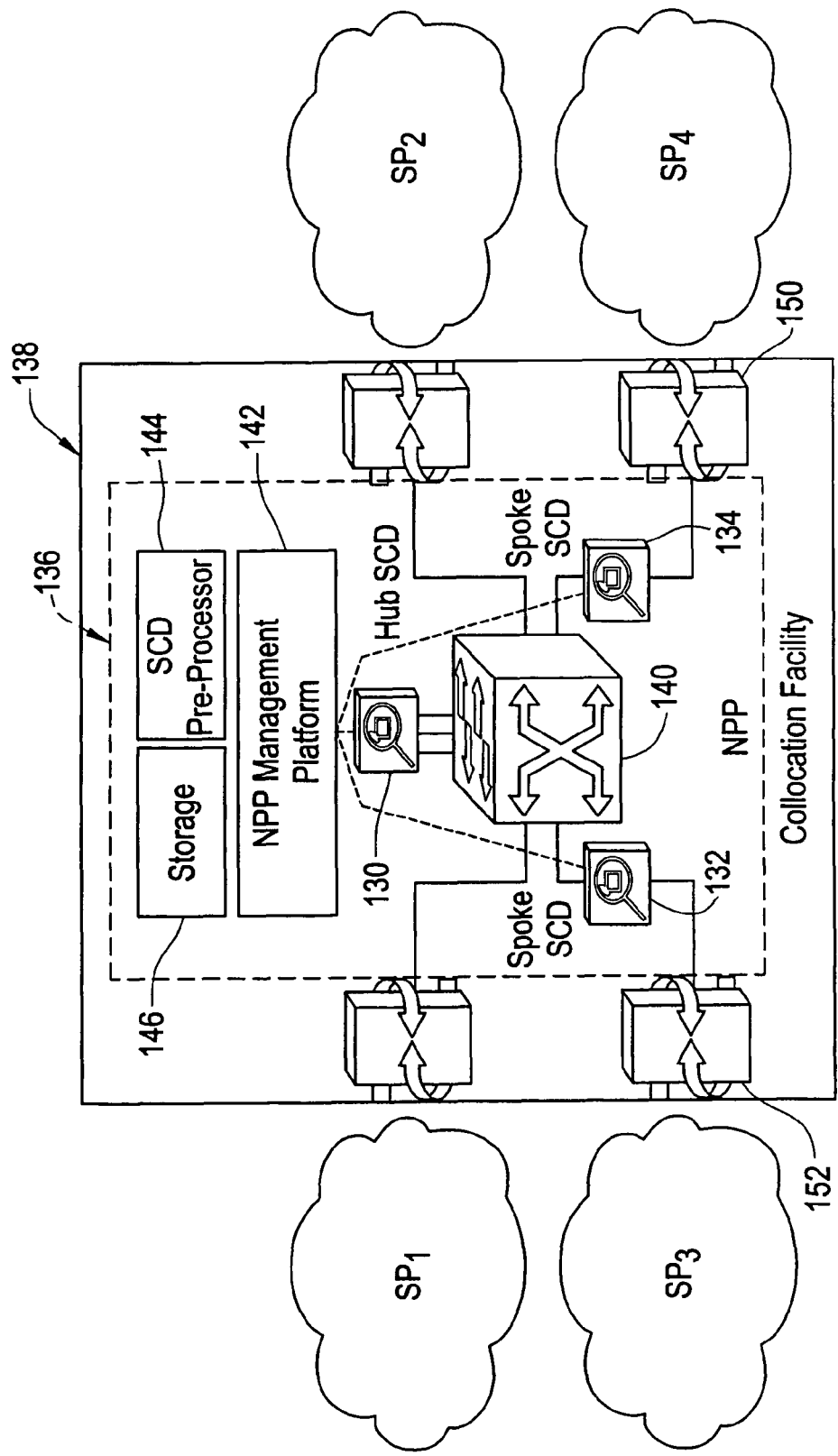
FIG. 9 is a block diagram showing a more detailed view of the configuration of the NPP, in accordance with a preferred embodiment of the present invention.

Referring now to FIG. 9, there is shown a more detailed view of the configuration of the network device or NPP, in accordance with a preferred embodiment of the present invention. The dotted lines show the primary components of an exemplary Service Creation Device (SCD) enabled network device, which is preferably located at a collocation facility 138. These components include one or more NPP switches 140, an NPP management platform 142, a SCD pre-processor 144, local file storage 146, and three SCD devices 130, 132, 134.

The NPP 136, through each service creation device 130, 132, 134, is configured to perform quality-of-service classification and re-marking, so as to enable the inter-operation of dissimilar quality of service (QoS) signaling schemes among supply chain participants. Another feature and advantage of the exemplary network device 136 is the synthetic generation of performance test packets and their subsequent measurement. This configuration of the NPP may be described as an SCD-enabled NPP 136.

The instrumentation in the form of the service creation device 130, 132, 134 is based on programmable network processor technology having the ability to read and write, in great detail, from and to each packet data that passes through it at very high packet rates, up to and beyond interfaces of 1 Gbit per second, for example.

Critical capabilities of the service creation device include: the ability to perform arbitrary pattern matching on packet headers and packet data; the ability to perform arbitrary re-writes to packet headers and packet data; performing quality-of-service classification and re-marking; and enabling a low level of OSS/BSS integration between participants in the supply chain. Additionally, since the service creation device 130, 132, 134 is based on programmable technology, additional functions may be developed as desired.

Operation of the supply chain is substantially simplified if quality-of-service classification and re-marking is preferably performed by, and controlled centrally, at the NPP.

By way of brief background, quality-of-service (QoS) classification and re-marking is necessary when differing service providers use different QoS signaling schemes. For instance, one provider may have multiple classes of service while another provider may have only one. In addition, different underlying transport technologies use different QoS signaling schemes, such as Diffserv DSCPs, MPLS EXP, ATM QoS, and the like. As a result, when traffic passes from one service provider to another through a NPP, it may be necessary to overwrite (i.e. re-mark) the QoS signaling schema of the one provider with that of the other provider, and vice versa, so that each provider handles subscriber traffic in a consistent way according to the needs of the subscriber. This process may require repeating at every NPP, depending on whether there is an inconsistency in adjacent QoS schemas.

To summarize, in order for the NPP's classification and re-marking to operate correctly, the quality-of-service classification performed at each NPP must perform substantially two functions; first, identify, on a per-subscriber packet basis, the subscriber virtual private network, and preferably the subscriber application and user community; and second, then re-mark the packet according to a QoS rule that properly describes how the subscriber application must be carried by the carrying service provider in the supply chain.

That is to say, the quality-of-service classification and re-marking process preferably comprises two stages: first, classification to identify the network(s) and/or subscriber application(s) and/or user(s)/subscriber(s); second, application of a set of rules to re-mark the results of the classification process to the correct QoS schema. This may require the re-marking of one or more QoS schemas in a single packet (i.e. Diffserv DCSPs, EXP, ToS, etc.).

Figure 11:
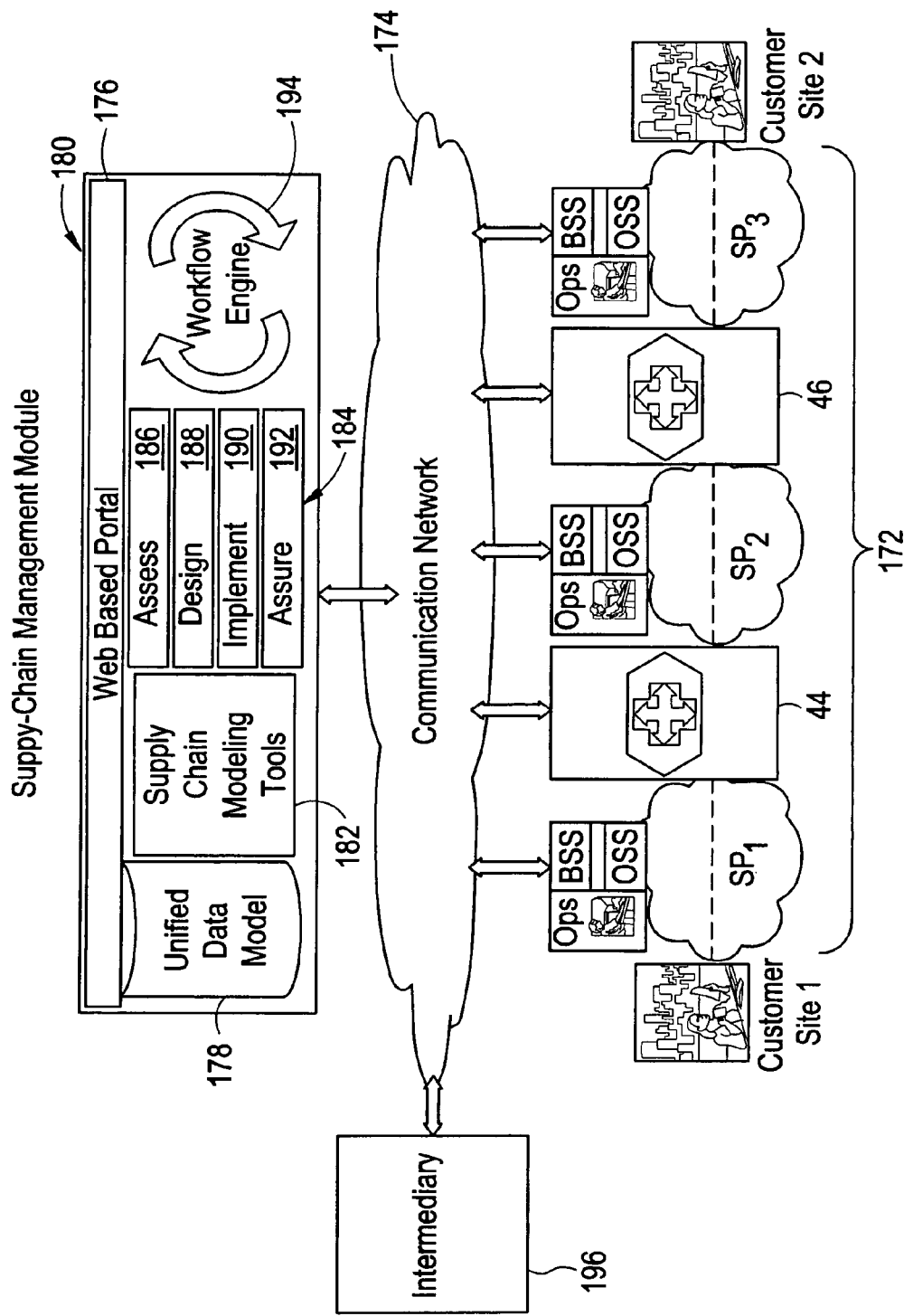
FIG. 11 is a block diagram illustrating a requirement planning system in accordance with a preferred embodiment of the present invention.

In a preferred embodiment, these re-marking rules are determined and employed or provided in the design programs 190 (FIG. 11) with the objective of satisfying subscriber network requirements, including the support of voice-over-IP end-to-end across the supply chain. Additionally, these re-marking rules are preferably configured into the programmability of each service creation device by the implement programs 192 (FIG. 11).

Note that traffic flowing in the opposite direction reverses the QoS classification and re-marking process.

Referring again to FIG. 9, the network device or NPP 136 accomplishes the above. It provides NPP-based quality-of-service classification and re-marking capabilities to service providers using the VPN of the present invention, via a service creation device 130, 132, 134. Each service creation device 130, 132, 134 may be used for service performance monitoring also.

Ideally, the service creation devices are positioned in line between every service provider gateway and respective NPP, such that if there were 20 service providers connected to an NPP, then 20 in-line service creation devices are generally incorporated in the NPP for each NPP (left and right) switch.

The SCD pre-processor 144 is used as an intermediary between the NPP management or operational support system or platform 142 and the physical service creation device 130, 132, 134. Particularly, the SCD pre-processor 144 is of particular relevance to performance testing, which generally generates considerable raw data, in that the raw data may be pre-processed locally within the NPP 136 rather than transmitting the data to a central processing system. Local pre-processing of the raw data reduces the volume of raw data without loss of information.

The local file system 146 is used as a local cache of data relevant to the service creation device 130, 132, 134 and NPP 136. The management platform 142 is used to perform and coordinate local management of the NPP 136 and service creation device 130, 132, 134, thereby reducing the load on any centralized management system.

As depicted, the SCD devices 132, 134 are deployed in a spoke configuration, where the SCD device 132, for instance, is located intermediate the NPP switches 140 and the service provider gateway 152. Similarly, the SCD device 134 interfaces the connection between the NPP switches 140 and the SP gateway 150.

Alternatively and optionally, the service creation devices may be deployed in a hub configuration where the SCD device 130, for instance, is located between various ports of the NPP switches 140 and the NPP. As a hub, the SCD 130 is shared between any of the service providers attached to the peering point 136; namely, service providers $SP_1$, $SP_2$, $SP_3$, $SP_4$.

In either configuration, the SCD is substantially directly connected to the NPP switches 140. The hub and spoke SCDs 130, 132, 134 are preferably managed remotely through the NPP management platform 142.

In addition, the configuration of the SCD-enabled NPP 136 provides a variety of capabilities including, but not limited to, classification, marking, monitoring, billing and security features, including transport quality-of-service (QoS) re-write, application QoS re-write, real time re-write, packet synthesis for reachability and delay testing, throughput analysis, timestamps, packet sensing, usage-based billing for voice-over IP and other applications, per-service provider billing, subscriber billing, signature analysis, intrusion detection, Denial of Service (DoS) protection, virus protection, etc.

Moreover, these features and capabilities are available wherever the SCD and related management hardware/software may be deployed, such as at the NPP (for multi-service provider networks), within a service provider (for on-net VPNs) or within a subscriber site for private networks. It is likely, for instance, that a number of SCD devices are deployed within a service provider at locations of high fabric density, such as at major points of presence (PoPs). In another instance, SCDs may be deployed within a service provider or a subscriber site in the case of a merger or acquisition, to overcome any differences in internal QoS schemas used by the merging entities.

Because of its various capabilities, the service creation device performs performance measurement and testing of the supply chain. Use of the service creation device obviates the need to rely on individual supply chain participants to measure and report on performance and present any necessary measurements in a standard format. Location of the SCD at the NPP, which is the service demarcation point between participants in the supply chain, facilitates initiation of any measurements or performance tests to be performed.

In a preferred embodiment, collectively the service creation devices 130, 132, 134 within the NPP 136 in a supply chain is capable of measuring and testing network performance, against contracts and/or SLAs and/or user experience, for substantially all the sub-components or participants within the supply chain.

More particularly, the service creation devices 130, 132, 134 are capable of both passive and active measurements and/or testing. In a passive mode, the SCD monitors subscriber traffic as it passes through the NPP 136 and SCD 130, 132, 134, in order to determine, for example, subscriber use and/or overuse. In an active mode, for active testing, the SCD injects data into the flow of subscriber traffic. Passive or active tests may be further processed to enable reporting on a variety of key performance criteria for the supply chain, such as reachability (i.e. the availability of a service component), round-trip delay, throughput, jitter, packet loss, mean time between failures (MTBF), and mean time to fix (MTTF).

As described above, the NPP of the present invention is configured to achieve substantially high levels of availability for subscriber VPN services in a number of ways. First, for example, FIGS. 8B, 8C show several options by which end-to-end service availability is enhanced.

Second, at each NPP, twin Ethernet switches (left and right) provide physical forwarding path redundancy for each connected service provider at each NPP. FIG. 5 shows one embodiment of a layout of a supply chain having dual redundant NPPs (north and south). As a result, each service provider may also connect to two NPPs, thereby raising the availability of the forwarding path for any VPN subscriber.

Third, and finally, the routing nexus and subscriber route propagation mechanism are designed to be highly available by, for instance, locating mirror-image subscriber routing tables, which are preferably stored in each border router dedicated to each service provider, at geographically separate, secure locations; by allowing multiple BGP protocol (route propagating) sessions between service provider gateways and the two routing nexus sites; by ensuring, via a BGP fail-over mechanism, that correct forwarding of subscriber packets is maintained in the event of any single point of failure in the route propagation architecture; and by maintaining route propagation duality (two separate, mirrored route propagation paths throughout the network) for substantially all subscriber routes.

Building, in part, on the above described configurations, features and advantages, a closed-loop service delivery system is disclosed. The service delivery system of the present invention contemplates the delivery of measurable network services.

This is accomplished in a manner drastically different from existing VPN and Internet model techniques because, in part, these current techniques do not employ a collaborative peering point architecture that allows service providers to extend end-to-end, service-level agreement-based virtual private networks beyond their own infrastructure.

In accordance with the service delivery system of the present invention, a service provider that offers a subscriber a service level agreement (SLA) between routers (i.e. an end-to-end SLA), is likely to manage those routers. In other words, in order to guarantee end-to-end service across the whole supply chain, the service delivery system of the present invention preferably contemplates that the service provider or administrative entity exercises (sole) control of the routers and each part of the infrastructure involved in that service provider's delivery of its SLA, which may be a sub-component of the overall end-to-end network and/or network service.

Figure 10:
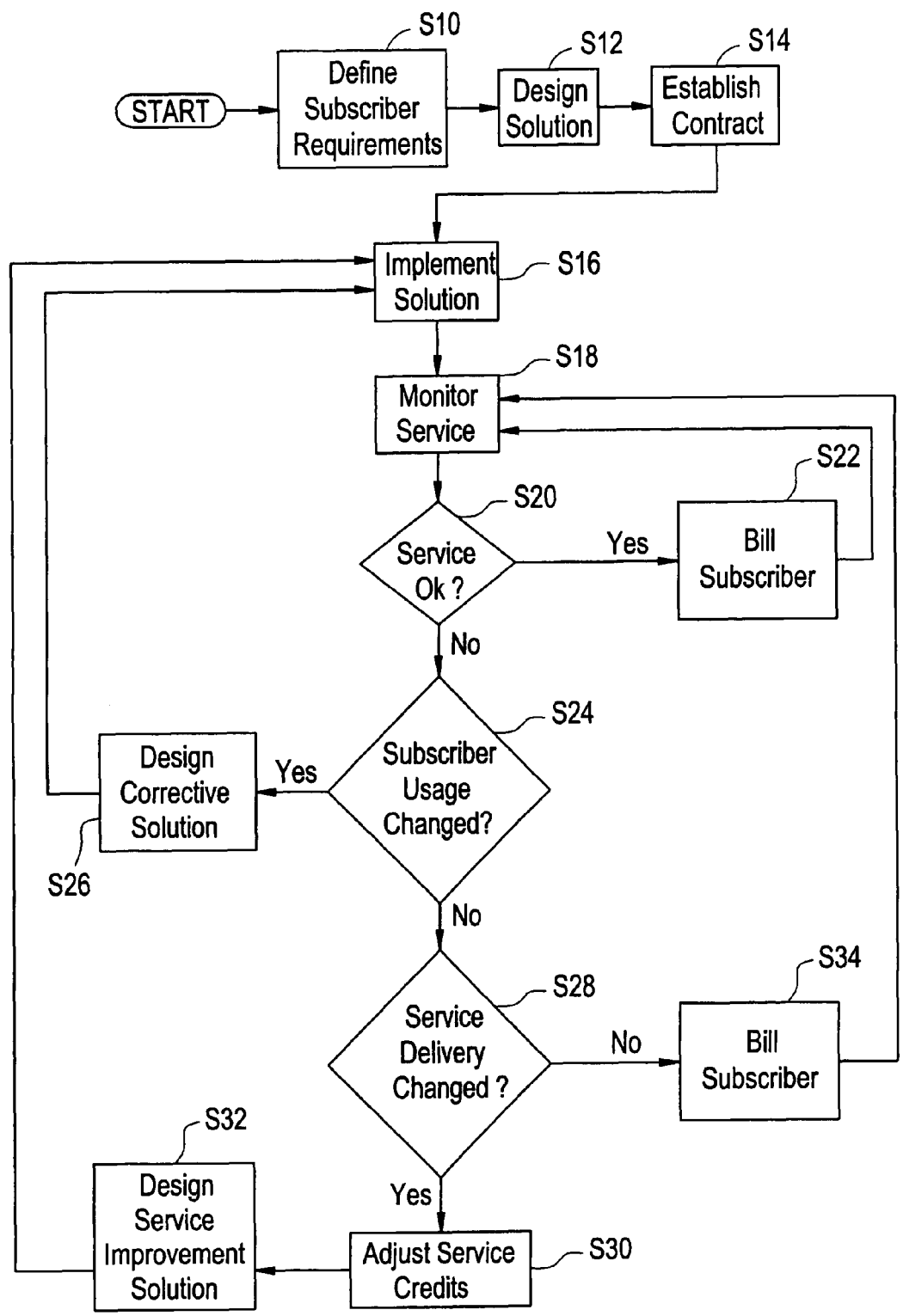
FIG. 10 is a flow chart of a closed-loop service delivery system in accordance with the present invention.

Referring now to FIG. 10, there is shown an exemplary per-SLA closed-loop service delivery system. The essential aspects of this closed-loop system (on a per-SLA basis) includes: capture of subscriber VPN service requirements; a service design methodology; a transport infrastructure on which to implement the service design so that the SLA is delivered and monitored; one or more monitoring mechanisms that preferably provide evidence of service delivery, such as to aid problem resolution and for billing purposes, and that preferably identifies which supplier is responsible for a SLA breach; and a financial incentive mechanism that motivates the service provider to maintain agreed-upon levels of service performance. In a preferred embodiment, all parts of the closed-loop system must function in the loop otherwise service performance is unpredictable and unbounded.

More specifically, as depicted, the closed-loop service delivery system of FIG. 10 begins with a common understanding of the subscriber's VPN service requirements, as at step 10 or S10. Once subscriber requirements are established, an end-to-end network service solution is designed such that suppliers may offer a service level agreement (S12).

Once the network solution is designed, contracts are established relating to that design (S14). These contracts preferably have service level agreements (SLAs) associated with them with punitive clauses intended to motivate service providers to supply service according to the contracted requirements during the duration of the contract.

At this juncture, the service is now implemented (S16) in the supply chain according to the contract(s). After implementation, the network/network service is monitored (S18) for any variations in service delivery performance or subscriber use, with respect to the SLAs contained within the contract(s), for example.

Service monitoring is an ongoing process that shows, in part, whether the supply chain suppliers' service(s) is/are performing according to their respective SLAs. Thus, a key decisional inquiry is whether the VPN service being provided falls within earlier-defined parameters (S18). It is also important to establish whether the end-to-end service required by the subscriber and supplied by an intermediary falls within earlier agreed parameters.

If so, the subscriber (and/or the intermediary) is billed (S22), and the monitoring process continues, as at S18. On the contrary, if the services do not meet the performance targets of the SLAs for substantially any reason, then remedial action may be taken, including an inquiry whether subscriber usage has changed (S24).

By way of example, some of the subscriber's VPN locations may be generating significantly more traffic than expected. As the supply chain VPN solution was not necessarily designed to handle this extra load, performance of the service may deteriorate to an unacceptable level; this is an indication that the subscriber needs more resources from one or more suppliers in the supply chain.

Effectively, the subscriber has breached one or more SLAs and has two options: control use of the VPN service at the problematic locations, or agree to a new SLA for service, the likely practical solution where suppliers provide more service (i.e. bandwidth, etc.) to the supply chain solution. Subsequently, requirements for a corrective solution are agreed upon, resulting in a new design for upgraded (or downgraded) VPN service (S26). The new solution is implemented (S16) and monitored (S18), as earlier described.

Alternatively, if subscriber usage is as agreed, the next logical inquiry is whether service monitoring reports show a deficiency on the part of any of the service providers in the supply chain (S28). Deterioration of service delivery may occur because of incorrect service design or because there is a current problem with the service provider's infrastructure. Either way, if any service provider is determined to be at fault, the service provider(s) is/are responsible for restoring service levels rapidly.

Service credits may be issued to the customer (S30), and a service improvement solution is designed (S32) and subsequently implemented, as at S16, whereupon the process proceeds as earlier described. If it is determined that service delivery has not changed, the subscriber is billed (S34).

As described above, the granularity of the closed-loop delivery system is that of a subscriber service level agreement. The closed-loop control system for service delivery is comprised, in part, of per subscriber design processes, monitoring systems (i.e. feedback) and financial incentives (i.e. punitive SLAs) that encourage VPN services to meet SLAs on an ongoing basis. In addition, the closed-loop system only works best if service performance monitoring is linked to a particular subscriber's service level agreement in order to show when acceptable or unacceptable service is being delivered.

Building, in part, on the above described configurations, features and advantages, a network requirements planning system is disclosed.

Referring now to FIG. 11, there is shown a preferred embodiment of a network requirements planning system of the present invention. The requirements planning system comprises a supply-chain management module 180, a network infrastructure 172 comprising one or more NPPs 44, 46, and a communications network 174 for interfacing the network 172 with the supply chain management module 180. FIG. 11 shows the relationships and interfaces between the module 180 and an exemplary virtual private network 172.

As depicted, the supply-chain management module 180 preferably includes a web-based portal 176, which serves as a gateway to users of the management module 180, preferably through a secure communications network or extranet.

The supply chain management module 180 also comprises a unified data model 178, a supply chain modeling tools platform 182, network transformation programs 184, and a workflow engine 194.

In this embodiment, the collective functions performed by the supply chain management module 180 are as earlier described and include, for example, working through specific agreements to the point of work orders to the service providers, in order to effect implementation of the VPN supply chain 172. Functions also include accepting work orders, making changes necessary in NPP 44, 46 configurations and set-up, in order to effect implementation of the contracted VPN supply chain 172, and dealing with the results of subsequent performance and service level agreement monitoring. Supporting application functionalities are performed on systems within the workflow engine 194.

Access to the supply chain management module 180 functions by system users, such as one or more service providers $SP_1$, $SP_2$, $SP_3$, supply chain participants or intermediaries 196, is preferably directly via a communications network 174, such as web-based portal access point, which has varying degrees of access privileges available. In a preferred embodiment, the intermediary 196 is representative of the single point of contact to the subscriber in obtaining VPN service. Alternatively, access may be had indirectly by telephone and/or fax communication.

The unified data model 178 is a logically-structured and well-defined integrated data storage for receiving and integrating all of the disparate information involved in assessing, designing, implementing and assuring a desired VPN supply chain infrastructure.

For example, the model 178 is equipped to process and integrate, in any desired business usable format, data or information pertaining to network requirements, contracts, SLAs, topology of NPPs and suppliers, subscriber design topology (both physical and logical), quality of service schemes, QoS classification and re-marking rules, service provider capabilities, proposed/planned/implementing/implemented supply chain solutions (i.e. topology, QoS rules, routing rules, implementation rules, etc.), performance, performance measurement, performance analysis, inventory, equipment status, trading preferences, and the like.

To summarize, the unified data model 178 is configured for processing and manipulating data from all of the different activities, programs or hardware components of the supply chain network into functional, business operational information. The model 178 is integrated in that it is able to transfer data from one program to another, helping users to coordinate tasks and merge information created with different software tools, for example. Additionally, the integrated features of the unified data model 178 provides users with a single source and repository of all information pertinent to the supply chain, and otherwise interacting with the supply chain management module 180.

The supply chain modeling tools platform 182 comprises one or more software applications useful in assisting in the development of desired modeling activities. Each modeling tool may take the form of a graphical (front-end) application that facilitates the mapping of one or more enterprise network requirements onto NPPs and service providers in such a way as to model a VPN supply chain solution. A likely end result or solution is a mix of distribution and transit service providers able to meet necessary geographic location, quality-of-service and other subscriber requirements.

Preferably, the supply chain modeling tools platform 182 also comprises modules used by the network transformation programs unit 184, to accomplish its tasks. These modules include, for example, a supplier qualification module, which is used to determine service provider feasibility to form part of a supply chain solution, and a supplier contract agreement module, which facilitates contract preparation. Both of these modules are used in the design programs 188.

Preferably, the modeling activities of the supply chain modeling tools platform 182 are performed with the assistance of a solution design tool (SDT). The solution design tool is a graphical application that assists a designer in mapping network requirements to a potential supply chain. As such, it may be viewed as an editor.

The solution design tool is also in communication with the unified data model 178, which contains both the subscriber network requirements and a normalized form of the potential service provider network, as well as service offerings of each service provider in the form of a product catalog. The product catalog of service provider capabilities include network service offering, such as geographic reach, QoS schemas, etc., and other network details, such as location of points of presence. Additionally, the unified data model 178 contains substantially all information relating to NPPs that may be used to form a supply chain in combination with the various service providers.

As such, the solution design tool is usable to map an enterprise's network requirements onto a potential supply chain that incorporates distribution and transit service providers, and NPPs. Also, the solution design tool is usable at various levels of granularity with respect to the assess 186, design 188 program modules.

The network transformation programs 184 component of the supply chain management module 180 primarily support the activities of a subscriber or intermediary 196 during the complete life-cycle of a managed service-level-agreement-based VPN service. The network transformation programs 184 comprises an assess program 186, a design program 188, an implement program 190 and an assure program 192.

Very briefly, the assess program 186 functions to provide an initial assessment of an enterprise network requirements to determine, for instance, key costs, associated benefits, and suitable approach. The design program 188 functions to provide an overall target solution design and a detailed solution design for the transformed enterprise network, including identifying a potential VPN supply chain. The implement program 190 functions to provide a workflow-assisted approach to establishing the components of the desired network infrastructure supply chain. Finally, the assure program 192 functions to provide that the supply chain VPN services and service providers that may form subcomponents of the desired end-to-end network service, performs as designed and contracted.

A more detailed discussion of the network transformation programs 184 may be had with reference to FIGS. 12 through 15.

Figure 12:
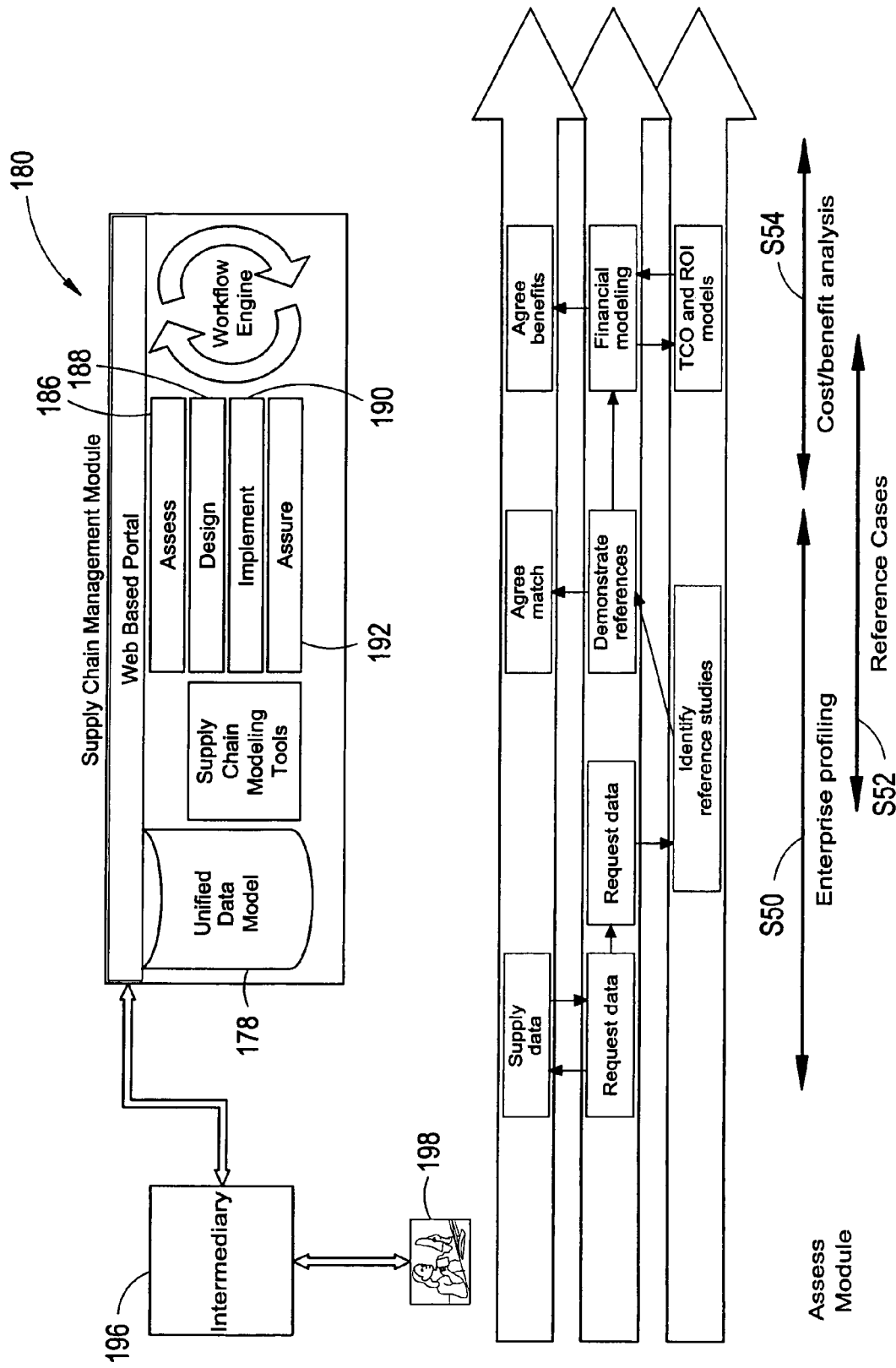
FIG. 12 is a block diagram showing one embodiment of the assess module of the network transformation programs of FIG. 11.

In a preferred embodiment, as shown in FIG. 12, the assess program or module 186 involves profiling an enterprise customer (S50). Generally, profiling involves establishing a customer's requirements for a virtual private network 172.

The requirements are analyzed employing reference cases/studies (S52), in order to identify reference case(s) that matches the profile of the enterprise client 198. Alternatively and optionally, the requirements may be analyzed, such as against any desired capabilities database using the criteria set out therein.

The results of the profiling exercise is analyzed by the assess module 186 in order to map results to existing reference studies to output a detailed cost/benefit or other financial modeling analysis (S54). The cost/benefit analysis preferably reflects an evaluation of the size of the service opportunity in terms of return on investment and total cost of ownership. The assess module is capable of iterative processing, since the outputted cost/benefit analysis is dependent on the value of a client's service requirements and assumptions, which may vary.

The full output results of the assess module 186 is preferably provided to the client 198 for review for desirability. If the client 198 decides against proceeding, the design module 188 is not activated.

On the other hand, if the assess module 186 output results (i.e. financial analysis) is found to be acceptable, the design module 188 (FIG. 13) is activated and populated with the correctly formatted and profiled data that describes the requirements of the desired/requested service configuration. For example, the formatted/profiled data may include particulars on site list, site type, site topology, a description of application traffic, assumptions, applications, required performance targets (i.e. delay, availability, etc.), and higher level requirements that may influence solution modeling, such as plans for mergers and acquisitions, voice/date convergence, planned projects, etc. Additionally, the above requirements may be further augmented by information regarding business drivers, timelines, competitive information, and costs and other financial considerations, and the like. All of the above information, in the form of requirements, are preferably stored in the unified data model 178.

Figure 13:
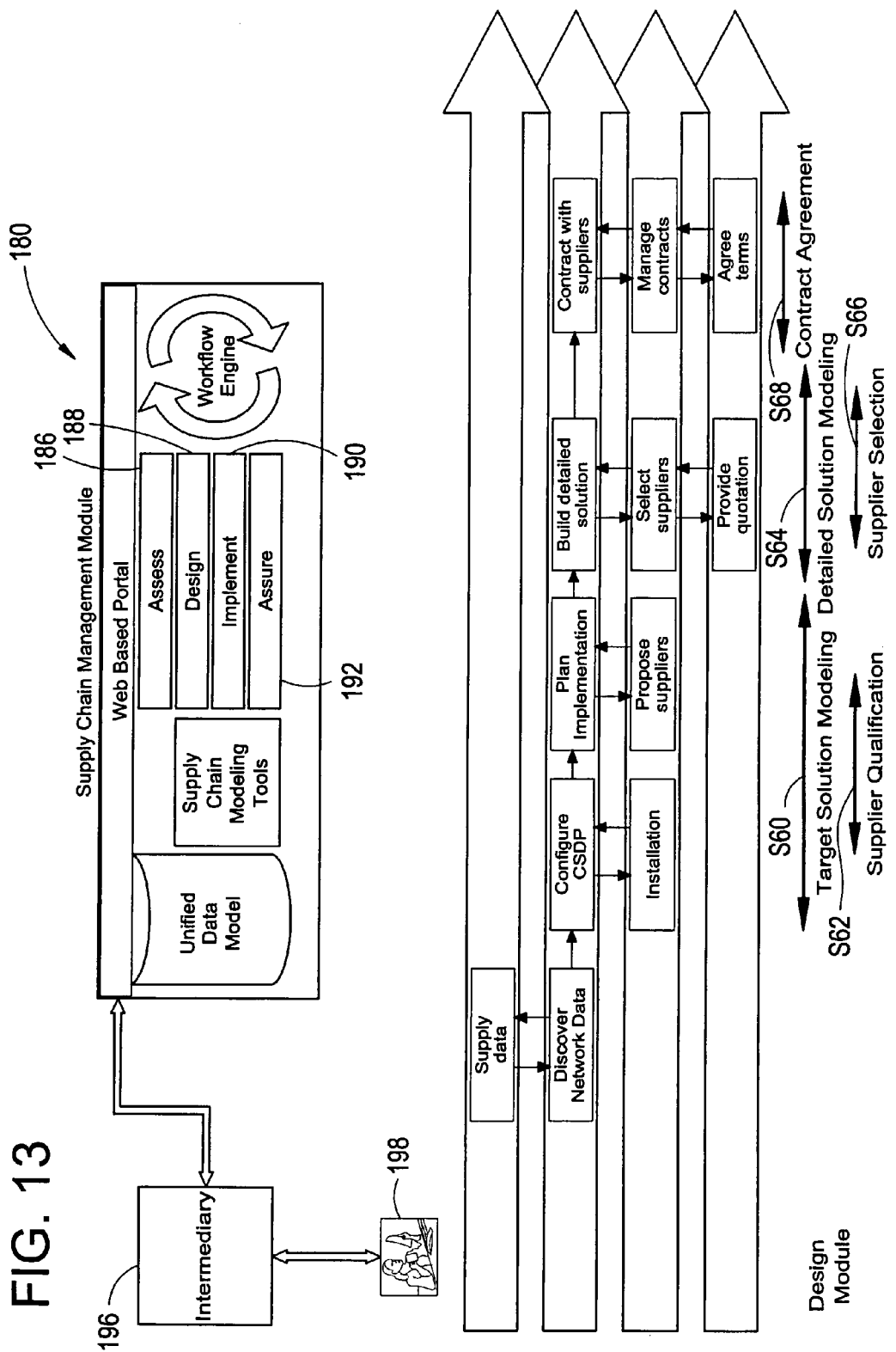
FIG. 13 is a block diagram showing one embodiment of the design module of the network transformation programs of FIG. 11.

Referring now to FIG. 13, an important objective of the design module 188 is to formulate an overall target solution for the desired or requested network configuration. Like the assess module 186, the design module 188 may require several iterative processing of data, in order to achieve an optimal target solution. Several iterations may be required due to, for example, evolving requirements of the client 198 and/or service providers $SP_1$, $SP_2$, $SP_3$, optimization of the potential supply chain network, etc.

Once the design module 188 is populated, one or more initial supply chain-oriented target solution models are developed, preferably in alignment to the client's needs (S60). The overall target solution determines the network configuration of the suppliers to form a supply chain solution that permits the requirements of the subscriber to be met.

The principal outputs of the design module 188 from the initial target solution development processing are an overall VPN supply chain topology with target site-to-site connectivity matrices and associated service level agreements. The design module 188 is capable of creating an ideal topology of peering points, transit gateways, distribution gateways, for example, without identifying suppliers. The design module 188 is also capable of calculating indicative estimations of end-to-end network performance (i.e. delay and availability) for comparison against client-indicated performance target(s). If targets are not provided by the client 198, the module 188 is capable of establishing performance targets, which will form part of the end-to-end VPN solution.

As part of the target solution development processing, a supplier qualification module is preferably employed (S62), to provide an outline of potential network supplier feasibility and, wherever possible, indicative pricing for potential suppliers of the target solution design.

Detailed solution modeling (S64) develops the initial target solution(s), stored in the unified data model 178, into a detailed VPN supply chain solution, iterating the detailed solution network design in response to the supplier selection cycles (S66). Supplier selection refers to the activity that interacts with potential suppliers for individual elements of the detailed VPN solution design to confirm and detail a supplier's supply offering.

In one aspect, the supplier selection activity employs participant services that liaison directly with suppliers. In another aspect, the supplier selection activity employs push/pull technology for rapid response. In yet another aspect, an electronic Request For Quote (RFQ) is generated and transmitted to selected service providers identified at the supplier qualification stage. The quotation is formulated and outputted in the form of a RFQ, the supplier response that is reviewed by the requester.

As each new VPN solution design iteration is achieved by the design module 188, more complete and detailed site connectivity matrices are produced along with the full end-to-end and sub-component service level agreement requirements.

Once a complete supply chain network solution is achieved with confirmed suppliers, a supplier contract agreement module preferably supports the creation of a committed and contracted VPN supply chain configuration and/or services (S68) including end-to-end and sub-component service level agreements, in order to meet a client's end-to-end service and service level agreement requirements.

It is important to note that assess and design modules 186, 188, although designed to handle complex solution requirements, are configurable to accommodate various client 198 and/or commercial strategies. For instance, the assess and design modules 186, 188 may be modified to disclose pricing information at different points in the iterative process, in the event price is an important concern. The assess and design modules 186, 188 are also configurable to add, delete or bypass one or more processing functionalities, depending on the circumstances.

Once individual VPN supply chain contracts, outputted by the design module 188, are agreed upon, the supply chain management module 180 awaits initiation of the implement module 190 (FIG. 14) in the form of client 198 authorization, via the purchasing participant, to generate service orders for fulfillment of the detailed network solution (S70).

Figure 14:
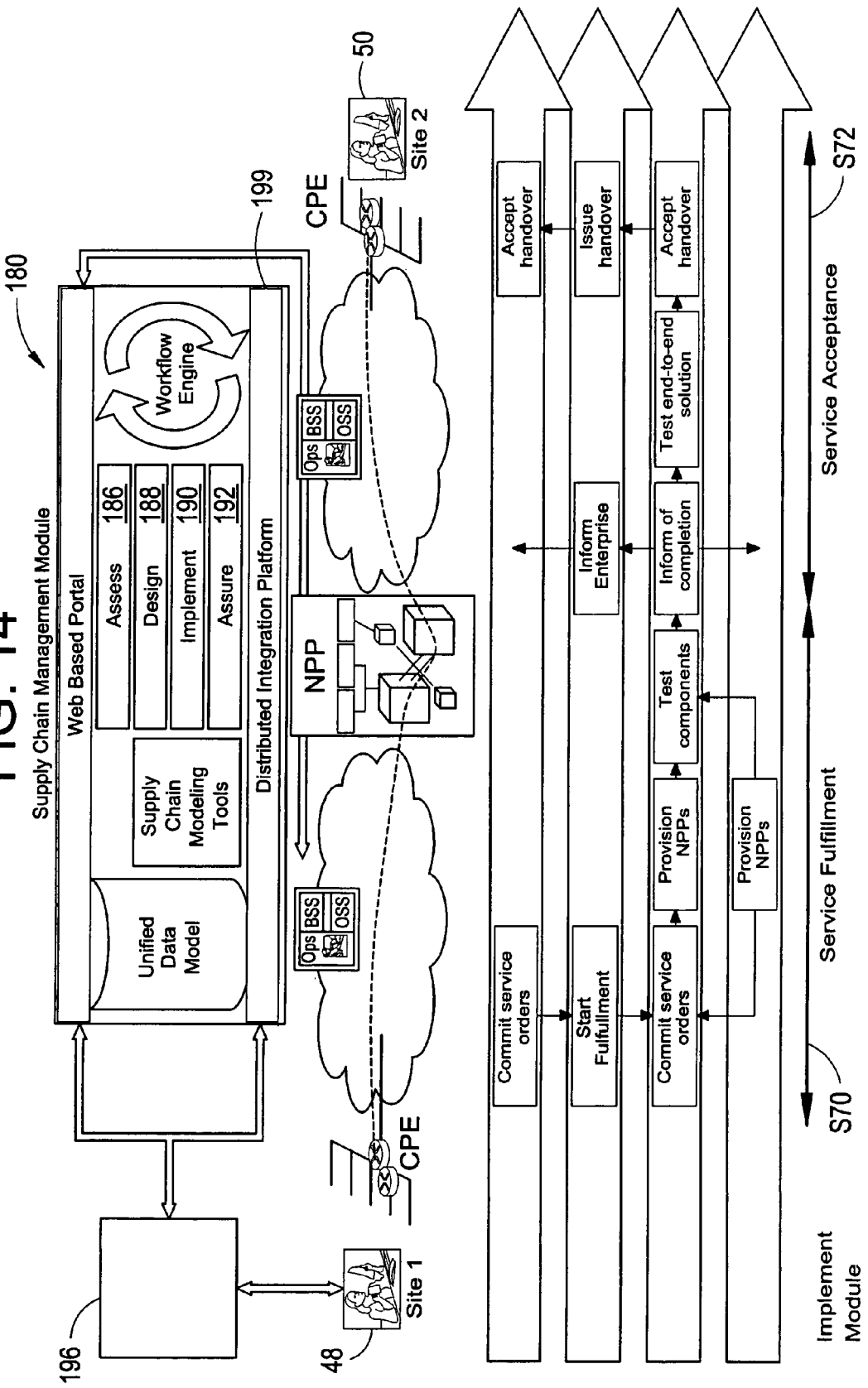
FIG. 14 is a block diagram showing one embodiment of the implement module of the network transformation programs of FIG. 11.

Referring now to FIG. 14, there is shown a block diagram of one embodiment of the implement module 190. A beginning point is, on contract agreement, initiation of an order for fulfillment the VPN services required (S70). One or more work orders, for each sub-component of the end-to-end VPN service solution, is subsequently generated and transmitted, in part, to respective service providers or suppliers. Transmission is preferably accomplished by the distributed integration platform 199.

Alternatively and optionally, transmission between the supply chain management module 180 and participating service providers may take the form of either telephone, facsimile, electronic mail or direct communication. Preferably, each work order includes detailed information that allows suppliers to correctly configure gateway devices and other equipment. The suppliers provide the sub-component VPN services and a responsible entity configures each necessary peering point NPP.

This straightforward but very structured heuristics of the implement module 190 obviates the need for integration between the service providers/suppliers and their respective business and technology systems. In addition, this same set of heuristics is used for each subsequent network component addition, move or change, essentially ensuring that all provisioning cycles are accurately driven from the same design requirements.

The VPN solution subcomponents are tested, including end-to-end reachability testing, whereafter all parties (i.e. the client 198, purchasing participant, respective service providers, etc.) are informed of service order test results and the availability and conformance to contract of the end-to-end VPN service solution.

At this juncture, participant billing and settlement systems may be instigated for the end-to-end managed VPN service, either on a site-by-site or completion-of-stages basis. Generally, if the test results outputted by the implement module 190 are acceptable, a service acceptance module is initiated (S72). If the outputted test results are not acceptable, modifications are made, as necessary, to facilitate implementation of a VPN solution in compliance with the service level agreement.

The service acceptance module provides a second series of certified tests coordinated with all the parties. Upon completion of the service acceptance module processing, the parties are informed of the availability and initial conformance to contract of the end-to-end managed VPN service and its sub-component parts. At this stage, the network service is delivered to the client 198, via a purchasing participant, whereupon billing and settlement systems may be instigated.

Figure 15:
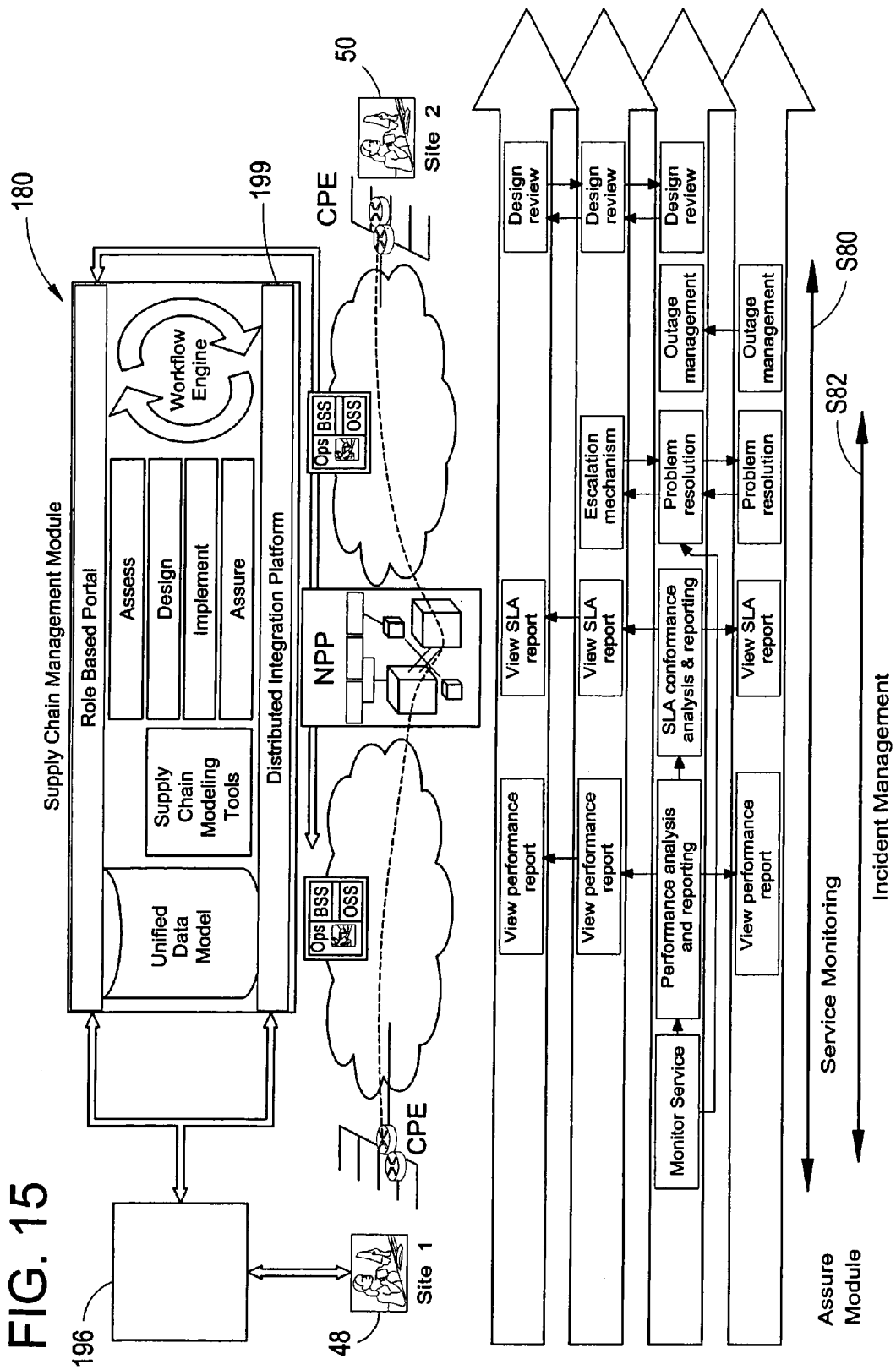
FIG. 15 is a block diagram showing one embodiment of the assure module of the network transformation programs of FIG. 11.

Referring now to FIG. 15, there is shown a block diagram of one embodiment of the assure module 192 of the present invention. An important aspect of the assure module 192 is proactive monitoring of service performance of the supply chain VPN services on a continual basis (S80). As with service monitoring, the assure module 192 enables incident management activities to be performed at a desired level of granularity (S82), such as on a per client VPN basis, per site basis, per class-of-service basis, etc. Accordingly, the assure module 192 provides appropriate incident management activity or alerts whenever a problem occurs with either end-to-end or individual subcomponent services. Moreover, the module 192 provides real-time reporting of service monitoring and incident management activity to participants.

Another important aspect of the assure module 192 is its capability of generating a variety of statistical performance information on substantially all aspects of the supply chain virtual private network. This statistical information may be stored for later analysis and use. It is also valuable for trend analysis, and provides reporting on defined metrics of a service, including appropriate reports. Performance statistics may be analyzed to provide key information for capacity planning for service providers. Performance statistics may be used periodically to verify and possibly re-optimize the design module 188 for any given supply chain solution.

Performance statistics may also be analyzed so that end-to-end and sub-component service performance is tested for conformance to contracted agreements, so that billing and settlement processes can correctly take place in the supply chain according to contract(s). Trouble tickets may be generated as appropriate.

Access to sufficiently detailed information at the right moment is key to successful management of the requirements planning system, because extensive information regarding the VPN and VPN services is critical to the ability to deliver continuing reliable service over time. In this section, we describe the service monitoring framework 200 as exemplified in FIG. 16.

The VPN requirements planning system of the present invention collects, stores, manipulates, analyzes and displays high-quality, high-granularity performance information from its own systems. Information is collected relating to each network service and other important data that may be associated with that service, such as contractual details, participant performance during procurement, fulfillment and assurance, network use and the like.

In addition, the requirements planning system of the present invention provides real-time and historical VPN service reporting to help service providers/participants: (1) show that service is currently being delivered as promised; (2) effect prompt fault resolution; (3) show that service was delivered as promised; and (4) and to optimize their service delivery infrastructure. More specifically, the real-time system provides reporting information dealing with points (1) and (2) above, and the historical system provides reporting information addressing points (3) and (4).

Figure 16:
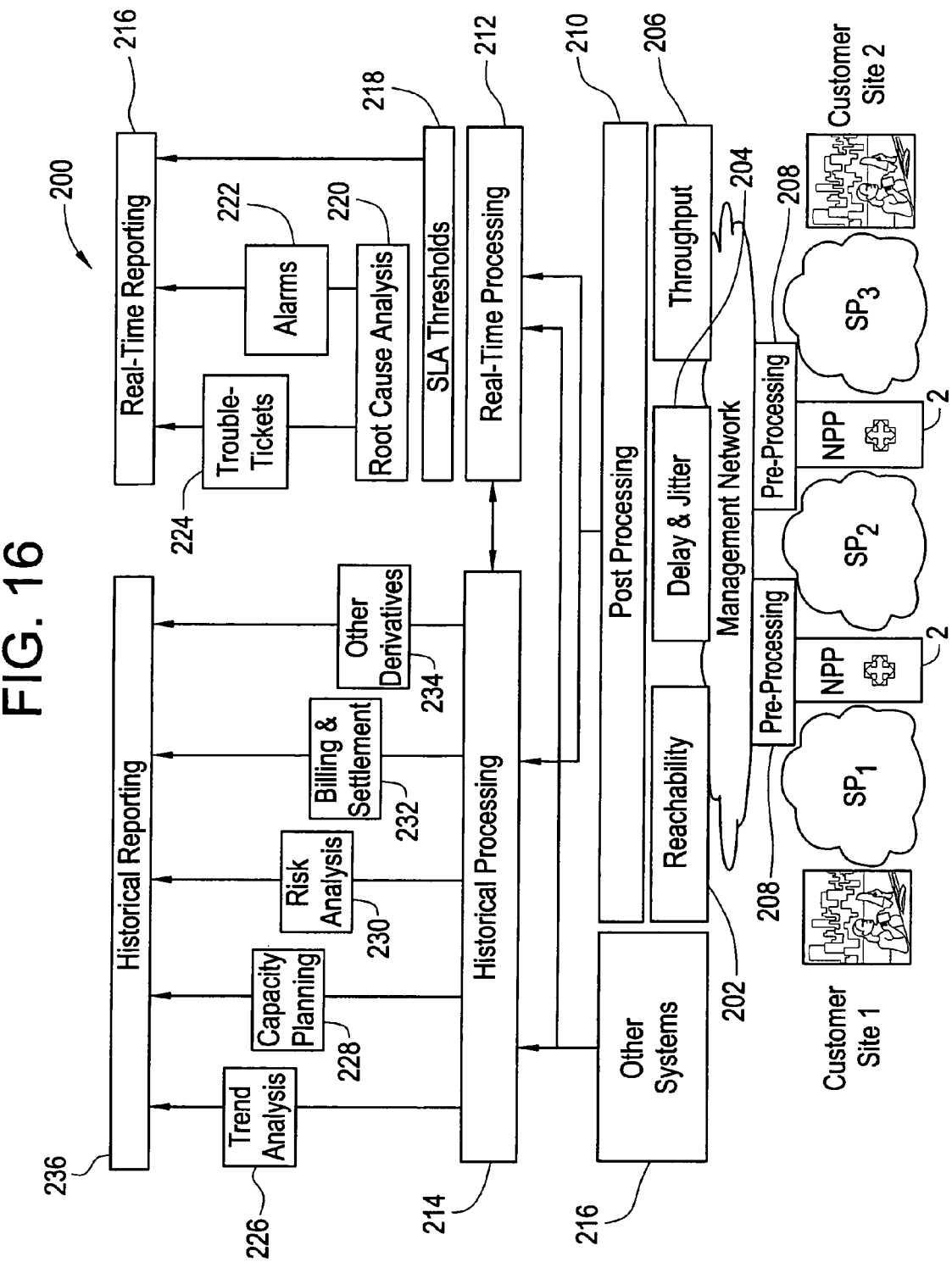
FIG. 16 is a block diagram showing a preferred embodiment of a service monitoring framework of the present invention.

Referring now to FIG. 16, VPN service performance data, such as data relating to service reachability 202, delay and jitter 204, packet loss and throughput 206 is collected at each peering point or NPP 2. Prior to the captured data being preferably transmitted to a central location, some pre-processing, as at 208, is performed at the NPP to minimize wide-area storage and transmission bandwidth requirements.

Broadly speaking, reachability data is used to confirm, independently of circumstances in the supply chain, whether subscriber traffic may traverse the entire SLA-based VPN service. This data, which may be derived from active testing techniques, establishes that an end-to-end forwarding path exists and that routing information is correctly propagated across the supply chain service. Delay and jitter data, which may also be derived by active testing techniques, is used to determine a service provider's forwarding path delay and jitter characteristics, preferably in real time or substantially real time. And throughput data, generally derived using passive testing techniques, is used to determine the amount of subscriber traffic on a site-to-site and/or per class-of-service and/or application and/or traffic-type basis as observed at ingress to and egress from service provider equipment. This data is used to determine whether more traffic than anticipated by a SLA is traversing the path relating to that SLA.

At the central site, service performance data (i.e. reachability, delay, jitter, etc.) collected from the service creation devices within the NPPs in the supply chain is processed, as at 210, and stored in the unified data model 178 ready for use by the real-time or historical information processing systems 212, 214. Information collected from other systems 216, such as the design, implement and assure modules 188, 190, 192, respectively, is also accessible through the data model 178 to the real-time or historical processing systems 212, 214. In other words, the total collected data relating to VPN performance is distributed to both real-time and historical processing systems 212, 214 as appropriate. In addition, both systems 212, 214 interface with each other.

The real-time processing system 212 is ultimately responsible for providing the desired reporting information 216 in substantially real time. This includes contractual and service performance information 218 and root cause analysis information 220 that are used to accurately identify each participant's fault. The reporting information 216 may also include status and/or detailed information from the trouble ticketing and alarm systems 224, 222.

This information 216, as well as real-time service delivery information, is available electronically as desired, such as via a local or secure global network, such as an extranet. Alternatively and optionally, the information may be available in hard and/or soft copy. Real-time service delivery reporting may be used, for example, to validate that a service has been installed, configured and is performing to specification. It may also be used to provide ongoing visibility that a VPN service is established and performing correctly.

Once real-time reporting information 216 is stored in the unified data model 178, it is ready for further processing by the historical processing system 214. As previously indicated, historical processing is performed on data captured by the NPPs 2 (i.e. VPN performance information), by other systems 216 (i.e. design, implement, assure modules 188, 190, 192), as well as from the real-time processing system 212. The historical processing system 214 is ultimately responsible for reporting historical information 236, electronically or otherwise, as desired.

Historical data may be manipulated or processed to provide information useful to participants in optimizing their service delivery infrastructure, for example, by focusing on service trend analysis 226, capacity planning 228, and risk analysis 230, along with information relating to failed and successful delivery of service on a per-participant, per-contract basis to enable billing and settlement 232. Further derivative data 234 may be processed as desired. One example is information useful to underpin a VPN service insurance market.

Data privacy is important to the requirements planning system of the present invention, and is made available in a restricted manner with varying degrees of access levels, as desired.

The many features and advantages of the present invention are apparent from the detailed specification. The above description is intended by the appended claims to cover all such features and advantages of the invention, and all suitable modifications and equivalents fall within the spirit and scope of the invention. For completeness, the above description and drawings are only illustrative of preferred embodiments and is not intended to limit the invention to the exact construction and operation herein illustrated and described.

What is claimed is:

1. A network device for providing standardized interconnectivity in a communications network, said network device comprising:
   a node comprising one or more routers, one or more Ethernet switches, one or more service creation devices and an operational platform, wherein
   (a) said one or more routers propagate data through the network deterministically;
   (b) said one or more Ethernet switches provide said network device with connectivity to at least one of a private or public network;
   (c) said one or more service creation devices provide quality-of-service management for service providers that provide different quality-of-service signaling schemes; and
   (d) said operational system platform provides communication between software and hardware components of said network device.

2. The network device according to claim 1, wherein said network device employs multi-protocol label switching technology.

3. The network device according to claim 2, wherein said multi-protocol label switching technology allows said network device to communicate with similar or dissimilar network transport technologies.

4. The network device according to claim 1, wherein said network device employs frame relay technology.

5. The network device according to claim 1, wherein said network device employs asynchronous transfer mode technology.

6. The network device according to claim 1, wherein each network device is arranged in a mirrored, redundant configuration.

7. The network device according to claim 1, wherein a functionality of said one or more routers and said one or more Ethernet switches mediates an incompatible network transport technology with said network device.

8. The network device according to claim 1, wherein a functionality of said one or more service creation devices mediates an incompatible signaling scheme with said network device.

9. The network device of claim 1, wherein a functionality of said one or more service creation devices mediates incompatible quality of service signaling with said network device.

10. The network device of claim 1, said network device adapted to provide duality of interconnections.

11. The network device of claim 1, said network device configured to implement Layer 3 routing across a Layer 2 transit connection for failure detection.

12. A network device usable in a virtual private network, said network device comprising:
    a node comprising a pair of routers, a pair of Ethernet switches, a service creation device and operating communication instructions, wherein
    (a) said pair of routers propagates data through the network;
    (b) said pair of Ethernet switches provides said network device with VPN connectivity;
    (c) said service creation device performs quality-of-service management for service providers that provide different quality-of-service signaling schemes ; and
    (d) said operating communication instructions provide hardware components of said network device.

13. The network device according to claim 12, further adapted with multi-protocol label switching technology.

14. The network device according to claim 12, further adapted with frame relay technology.

15. The network device according to claim 12, further adapted with asynchronous transfer mode technology.

16. The network device according to claim 12, each arranged in a mirrored, redundant configuration.

17. The network device according to claim 12, wherein a functionality of said pair of routers and said pair of Ethernet switches mediate an incompatible network transport technology through said network device.

18. The network device according to claim 12, wherein a functionality of said service creation device mediates an incompatible signaling scheme through said network device.

19. The network device of claim 12, wherein a functionality of said service creation device mediates incompatible quality of service signaling through said network device.

20. The network device of claim 12, said network device adapted to provide duality of interconnections therein.

21. The network device of claim 12, said network device adapted to implement Layer 3 routing across a Layer 2 transit connection for failure detection.

22. In an end-to-end architecture for delivery of managed network service, a network node serving as a peering point of interconnection, the node comprising:
(a) a pair of routers for propagating data through the network;
(b) a pair of Ethernet switches for providing said network device with connectivity;
(c) programmable instrumentation to perform quality-of-service classification and quality-of-service remarking functions for service providers that provide different quality-of-service signaling schemes in the node ;and
(d) an operating system for enabling communication between software and hardware components of the node.

23. A network device comprising:
a node comprising at least one router, at least one switch, an instrumentation and an operating system, wherein
said at least one switch provides connectivity to a communications network;
said instrumentation provides quality-of-service mapping for connecting service providers that provide different quality-of-service signaling schemes, aggregation, de-aggregation and performance testing functions between the node and another incompatible node; and
said operating system facilitates communication between software and hardware components of said node.

24. The network device according claim 23, adapted to read and write from and to each data packet passing therethrough.

25. The network device according to claim 22, wherein the quality of service re-marking functions occur throughout said communications network.

26. The network device according to claim 25, wherein said quality of service re-marking functions facilitate segmentation of quality of service support along a route of said communications network.

27. The network device according to claim 23, wherein said instrumentation provides performance testing of said communications network.

28. The network device according to claim 23, wherein said instrumentation facilitates testing of performance of a segment of said communications network.

29. The network device according to claim 23, said instrumentation employing one or more passive testing technique for testing an attribute of said communications network.

30. The network device according to claim 23, said instrumentation employing one or more active testing technique for testing an attribute of said communications network.

31. The network device according to claim 23, said instrumentation adapted to test an attribute of said communications network for at least one of reachability, delay, throughput, jitter, packet loss, mean time between failure, and mean time to fix.

32. The network device according to claim 23, said instrumentation comprising a pre-processor, storage, and a management platform.

33. The network device according to claim 23, said instrumentation adapted to perform arbitrary pattern matching on at least one of a packet header and packet data.

34. The network device according to claim 23, said instrumentation adapted to perform arbitrary re-writes to at least one of a packet header and packet data.

35. The network device according to claim 23, said instrumentation adapted to allow programmability of one or more desired functions.

36. The network device according to claim 23, said instrumentation interfacing a connection between said at least one switch and a gateway of said one or more service providers.

37. The network device according to claim 23, said instrumentation deployable in at least one of a spoke and hub configuration.

38. The network device according to claim 23, said instrumentation deployed on a per service provider basis.

39. The network device according to claim 23, said instrumentation being deployable on a shared basis between more than one service provider.

40. The network device according to claim 23, said instrumentation being managed remotely through said management platform.

41. The network device according to claim 23, which configuration provides at least one of mediation, performance monitoring, billing and security features.

* * * * *

UNITED STATES PATENT AND TRADEMARK OFFICE
CERTIFICATE OF CORRECTION

PATENT NO. : 7,764,700 B2 Page 1 of 1
APPLICATION NO. : 11/790842
DATED : July 27, 2010
INVENTOR(S) : Charles S. Muirhead et al.

It is certified that error appears in the above-identified patent and that said Letters Patent is hereby corrected as shown below:

In column 37, line 11, in Claim 22, delete "node ;and" and insert -- node; and --, therefor.

In column 37, line 27, in Claim 24, after "according" insert -- to --.

In column 37, line 40, in Claim 28, after "wherein" delete "15".

Signed and Sealed this

Twenty-third Day of November, 2010

David J. Kappos
*Director of the United States Patent and Trademark Office*